United States Patent
Tsugawa

(10) Patent No.: US 10,715,074 B2
(45) Date of Patent: Jul. 14, 2020

(54) MOTOR DIAGNOSIS METHOD AND POWER CONVERSION DEVICE USING SAME

(71) Applicant: NISSAN MOTOR CO., LTD., Yokohama-shi, Kanagawa (JP)

(72) Inventor: Dai Tsugawa, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/063,431

(22) PCT Filed: Dec. 21, 2016

(86) PCT No.: PCT/JP2016/088065
§ 371 (c)(1),
(2) Date: Jun. 18, 2018

(87) PCT Pub. No.: WO2017/110855
PCT Pub. Date: Jun. 29, 2017

(65) Prior Publication Data
US 2018/0375459 A1 Dec. 27, 2018

(30) Foreign Application Priority Data
Dec. 21, 2015 (JP) ................................. 2015-248793

(51) Int. Cl.
*H02P 29/024* (2016.01)
*H02P 29/02* (2016.01)
(Continued)

(52) U.S. Cl.
CPC ........ *H02P 29/0241* (2016.02); *B60L 3/0061* (2013.01); *H02P 29/02* (2013.01); *H02P 21/20* (2016.02)

(58) Field of Classification Search
CPC combination set(s) only.
See application file for complete search history.

(56) References Cited

U.S. PATENT DOCUMENTS 5,739,649 A * 4/1998 Akao ................... B60L 3/0023
318/139
7,498,761 B2 * 3/2009 Iwashita ................ H02P 29/10
318/727

(Continued)

FOREIGN PATENT DOCUMENTS

CN 103698699 A 4/2014
CN 103701394 A 4/2014
(Continued)

OTHER PUBLICATIONS

Omata JP2017093151, "Voltage sensor abnormality diagnostic device", 2015 (Year: 2015).*

*Primary Examiner* — Bickey Dhakal
(74) *Attorney, Agent, or Firm* — Foley & Lardner LLP

(57) ABSTRACT

A diagnosis method for diagnosing a state of a motor includes an application step in which a voltage is applied to the motor on the basis of a non-rotating voltage signal that causes a rotation speed of the motor to become 0, and a measurement step in which a current supplied to the motor, to which the voltage has been applied, is measured. The diagnosis method includes a calculation step in which an electrical characteristic of the motor is calculated on the basis of the current of the motor measured by the measurement step, and a determination step in which an abnormality of the motor is determined on the basis of the electrical characteristic of the motor calculated by the calculation step and a parameter related to the non-rotating voltage signal.

8 Claims, 17 Drawing Sheets

(51) Int. Cl.
*B60L 3/00* (2019.01)
*H02P 21/20* (2016.01)

(56) References Cited

U.S. PATENT DOCUMENTS

| | | | | |
|---|---|---|---|---|
| 8,710,775 | B2* | 4/2014 | Sagami | B62D 5/0487 |
| | | | | 318/400.02 |
| 9,219,441 | B2* | 12/2015 | Yasui | H02P 6/00 |
| 9,903,931 | B2* | 2/2018 | Omata | G01R 35/00 |
| 2013/0038342 | A1 | 2/2013 | Nozaki | |
| 2013/0249448 | A1* | 9/2013 | Kobayashi | H02P 21/141 |
| | | | | 318/400.02 |
| 2018/0294751 | A1* | 10/2018 | Park | H02P 6/12 |

FOREIGN PATENT DOCUMENTS

| | | |
|---|---|---|
| JP | 2003-47104 A | 2/2003 |
| JP | 2012-23813 A | 2/2012 |
| JP | 2014-241720 A | 12/2014 |
| WO | WO 2011/135652 A1 | 11/2011 |

* cited by examiner

MOTOR DIAGNOSIS METHOD AND POWER CONVERSION DEVICE USING SAME

TECHNICAL FIELD

The present invention relates to a diagnosis method for diagnosing the state of a motor, and a power conversion device using this method.

BACKGROUND ART

JP2012-23813A discloses a diagnosis device that determines a motor failure when the motor rotation speed exceeds a predetermined value.

SUMMARY OF INVENTION

In the above-described diagnosis method, the motor itself must be rotating in order to diagnose a motor failure. Therefore, a problem exists in that in a state in which the motor cannot rotate or a state in which it is unclear whether the motor is in a state in which it can rotate, if the motor is driven to rotate in order to diagnose the state of the motor, the load of a control device may increase, and this may lead to failures.

The present invention was created with a focus on the above problem, and an object thereof is to provide a diagnosis method with which a motor can be diagnosed even if the motor is in a non-rotating state in which the rotation is stopped, and to provide a power converter using this method.

According to one aspect of the present invention, a diagnosis method for diagnosing a state of a motor includes an application step in which a voltage is applied to the motor on the basis of a non-rotating voltage signal that causes a rotation speed of the motor to become 0, and a measurement step in which a current supplied to the motor, to which the voltage has been applied by the application step, is measured. The diagnosis method includes a calculation step in which an electrical characteristic of the motor is calculated on the basis of the current of the motor measured by the measurement step, and a determination step in which an abnormality of the motor is determined on the basis of the electrical characteristic of the motor calculated by the calculation step and a parameter related to the non-rotating voltage signal.

DESCRIPTION OF EMBODIMENTS

Embodiments of the present invention will now be explained below referring to the attached drawings.

First Embodiment

Figure 1:
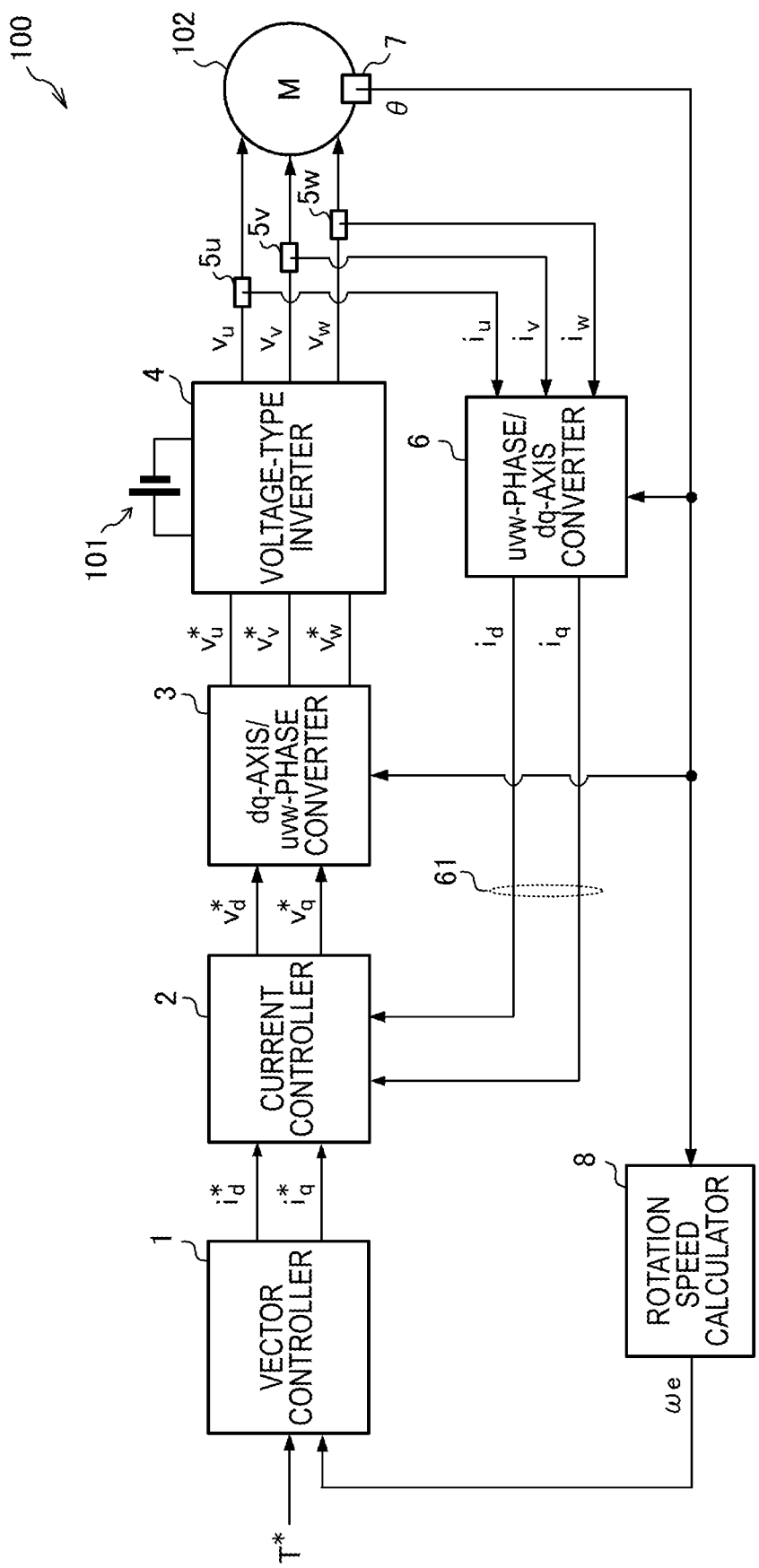
FIG. 1 is a block diagram illustrating a configurational example related to a power conversion device according to a first embodiment of the present invention.

FIG. 1 is a block diagram illustrating a configurational example related to a power conversion device according to a first embodiment of the present invention.

A power conversion device 100 is a power supply device that converts power supplied from a power source and supplies the power to a motor, and is a power converter installed in, for example, a hybrid vehicle or an electric vehicle. In the present embodiment, the power conversion device 100 converts direct current (DC) power to be supplied from a power source 101 to a motor 102 to alternating current (AC) power.

The power source 101 supplies power to the motor 102. The power source 101 is realized by, for example, a battery or a fuel cell. As a battery which can be used as the power source 101, mention may be made of a lithium ion battery and the like.

The motor 102 is an AC motor that is driven by AC power. The motor 102 is realized by, for example, a synchronous motor such as a permanent magnet motor or an induction motor. The motor 102 of the present embodiment is an IPM (Interior Permanent Magnet) motor constituted by a stator to which a coil is provided and a rotor in which a permanent magnet is embedded.

The power conversion device 100 includes the following: a vector controller 1; a current controller 2; a dq-axis/uvw-phase converter 3; a voltage-type inverter 4; current detectors 5u, 5v, and 5w; a uvw-phase/dq-axis converter 6; a rotor position detector 7; and a rotation speed calculator 8.

The vector controller 1 executes vector control so as to control the power to be supplied to the motor 102 using a coordinate system of two mutually orthogonal axes in order to control the torque generated in the motor 102. The d-axis represents a magnetic direction component, and the q-axis represents a torque direction component.

The vector controller 1 acquires a torque command value T* that determines a drive force of the motor 102 from a controller (not illustrated). In the controller (not illustrated), the torque command value T* is calculated according to the operation state of the vehicle. For example, the torque command value T* increases as the depression amount of the accelerator pedal provided to the vehicle increases.

The vector controller 1 calculates, on the basis of the torque command value T* for the motor 102 and a rotation speed $\omega_e$ of the motor 102, a current command vector to be supplied to the motor 102, which in the present embodiment is a d-axis current command value $i_d^*$ and a q-axis current command value $i_q^*$. For example, the vector controller 1 executes maximum torque control to control the current command vector such that the torque generated in the motor 102 reaches a maximum using a magnet torque and a reactance torque.

Further, the vector controller 1 executes non-interference control to control the current command vector such that an interference component generated between the d-axis component (d-axis current) and q-axis component (q-axis current) supplied to the motor 102 is suppressed. The vector controller 1 also executes field weakening control to control the d-axis current such that the induction voltage generated in the motor 102 is suppressed in a high-speed rotation region of the motor 102.

In the present embodiment, a vector control map, in which the d-axis current command value and the q-axis current command value are associated with each other at each operation point specified by the torque command value T* and the rotation speed $\omega_e$ of the motor 102, is stored in advance in the vector controller 1. This vector control map is appropriately set by experimental data or simulation, etc.

When the vector controller 1 acquires the torque command value T* and the rotation speed $\omega_e$ for the motor 102, the vector controller 1 refers to the vector control map in order to calculate the d-axis current command value $i_d^*$ and the q-axis current command value $i_q^*$ which are associated at the operation point specified by the torque command value T* and the rotation speed $\omega_e$. The vector controller 1 outputs the d-axis current command value $i_d^*$ and the q-axis current command value $i_q^*$ to the current controller 2.

The current controller 2 feeds back a current vector related to the current supplied to the motor 102 from the voltage-type inverter 4 on the current command vector output from the vector controller 1 to generate a voltage command vector.

In the present embodiment, the current controller 2 calculates a d-axis voltage command value $v_d^*$ so that the deviation between the d-axis current command value $i_d^*$ and a d-axis current detection value $i_d$ of the motor 102 converges on zero. Further, the current controller 2 calculates a q-axis voltage command value $v_q^*$ so that the deviation between the q-axis current command value $i_q^*$ and a q-axis current detection value $i_q$ converges on zero. The current controller 2 outputs the calculated d-axis voltage command value $v_d^*$ and q-axis voltage command value $v_q^*$ to the dq-axis/uvw-phase converter 3.

As shown in the following Equation (1), the dq-axis/uvw-phase converter 3 converts, on the basis of an electrical angle θ of the motor 102, the d-axis voltage command value $v_d^*$ and q-axis voltage command value $v_q^*$ to a U-phase voltage command value $v_u^*$, a V-phase voltage command value $v_v^*$, and a W-phase voltage command value $v_w^*$, which are three-phase voltage command values. The dq-axis/uvw-phase converter 3 outputs the three-phase voltage command values $v_u^*$, $v_v^*$, and $v_w^*$ to the voltage-type inverter 4.

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta & -\sin\theta \\ \sin\theta & \cos\theta \end{bmatrix} \begin{bmatrix} v_d^* \\ v_q^* \end{bmatrix} \quad (1)$$

The voltage-type inverter 4 is a power converter that converts DC power output from the power source 101 to three-phase AC power. The voltage-type inverter 4 generates three-phase AC voltages $v_u$, $v_v$, and $v_w$ by pulse width modulation (PWM) control of the voltage of the power source 101 on the basis of the three-phase voltage command values $v_u^*$, $v_v^*$, and $v_w^*$.

For example, the voltage-type inverter 4 includes a pair of switching elements corresponding to each phase, and compares a duty command value generated on the basis of the voltage command value $v_u^*$, $v_v^*$, and $v_w^*$ of each phase with a carrier signal to generate a PWM signal of each phase. The voltage-type inverter 4 generates a drive signal for driving the pair of switching elements on the basis of the PWM signal generated for each phase.

Since the pair of switching elements are switch controlled on the basis of the generated drive signal, a DC voltage of the power source 101 is converted to three-phase pseudo AC voltages $v_u$, $v_v$, and $v_w$ and applied to the motor 102. Thereby, AC currents $i_u$, $i_v$, and $i_w$ are supplied from the power source 101 to the coils of each phase in the motor 102.

The current detectors 5u, 5v, and 5w respectively detect the U-phase current $i_u$, the V-phase current $i_v$, and the W-phase current $i_w$ that are supplied from the voltage-type inverter 4 to the motor 102.

The current detector 5 is connected to a U-phase power line that connects the voltage-type inverter 4 and the U-phase coil of the motor 102, and the current detector 5v is connected to a ti-phase power line that connects the voltage-type inverter 4 and the V-phase coil of the motor 102. The current detector 5, is connected to a W-phase power line that connects the voltage-type inverter 4 and the V-phase coil of the motor 102. The current detectors 5v, and 5w output the detected three-phase AC currents $i_u$, $i_v$, and $i_w$ to the uvw-phase/dq-axis converter 6.

As shown in the following Equation (2), the uvw-phase/dq-axis converter 6 converts, on the basis of the electrical angle θ of the motor 102, the three-phase AC currents $i_u$, $i_v$, and $i_w$ to the d-axis current detection value $i_d$ and the q-axis current detection value $i_q$.

$$\begin{bmatrix} i_d \\ i_q \end{bmatrix} = \begin{bmatrix} \cos\theta & \sin\theta \\ -\sin\theta & \cos\theta \end{bmatrix} \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_u \\ i_v \\ i_w \end{bmatrix} \quad (2)$$

The uvw-phase/dq-axis converter 6 outputs the d-axis current detection value $i_d$ and the q-axis current detection value $i_q$ to the current controller 2. One of the current detectors $5_u$, $5_v$, and $5_w$ may be eliminated so as to calculate the d-axis current detection value is $i_d$ and a q-axis current detection value $i_q$ using the relationship shown in the following Equation (3).

$$i_w + i_u + i_v = \qquad (3)$$

The rotor position detector 7 is provided to the motor 102, and detects the rotor position of the motor 102 in a predetermined period to calculate the electrical angle θ of the rotor on the basis of the detected value. The rotor position detector 7 is realized by, for example, a resolver or a pulse encoder. The rotor position detector 7 outputs the calculated electrical angle θ of the rotor to the dq-axis/uvw-phase converter 3, the uvw-phase/dq-axis converter 6, and the rotation speed calculator 8 respectively.

The rotation speed calculator 8 calculates, on the basis of the electrical angle θ from the rotor position detector 7, the difference between the current electrical angle θ and the previous electrical angle, i.e. the amount of change in the electrical angle θ per unit time. The rotation speed calculator 8 calculates the rotation speed $\omega_e$ of the motor 102 from this amount of change in the electrical angle θ, and outputs the rotation speed $\omega_e$ to the vector controller 1.

Next, a dq-axis coordinate system motor model of the motor 102 will be explained.

Figure 2:
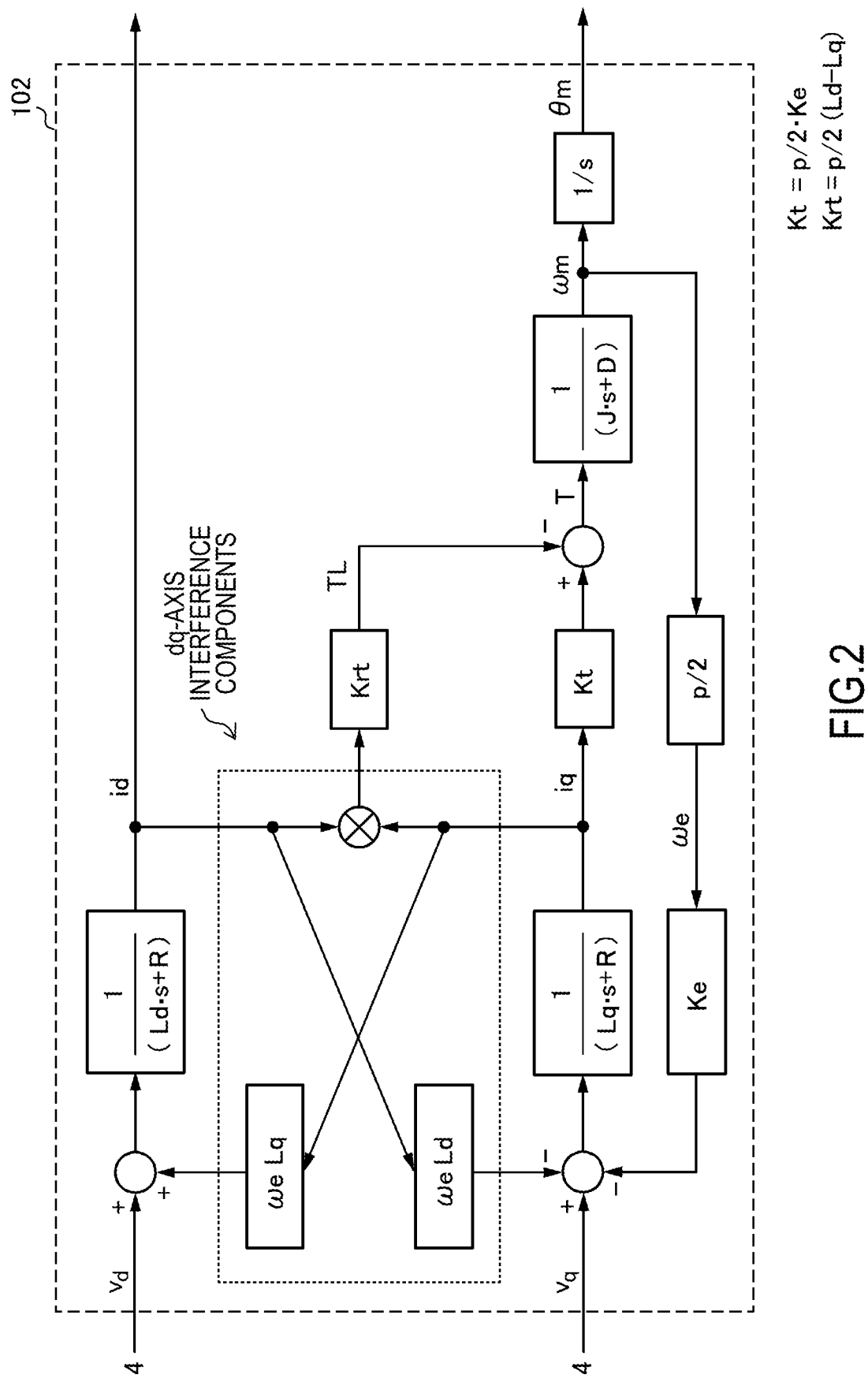
FIG. 2 is a model diagram explaining one example of a dq-axis coordinate system model related to a motor of the present embodiment.

FIG. 2 illustrates one example of a motor model in which the configuration of the motor 102 of the present embodiment is modeled in a dq-axis coordinate system.

In the motor model shown in FIG. 2, $L_d$ is the d-axis inductance, $L_q$ is the q-axis inductance, R is the armature coil resistance, and $\omega_e$ is the electrical angle speed. Since the motor 102 is an IPM motor, the q-axis inductance $L_q$ is smaller than the d-axis inductance $L_d$ ($L_d > L_q$).

$K_e$ is the induction voltage constant, p is the number of pole pairs of the motor 102, and $K_t$ is a value obtained by multiplying the induction voltage constant $K_e$ by a value resulting from dividing the pole pair number p by 2. Further, $K_{rt}$ is a value obtained by multiplying a value resulting from dividing the pole pair number p by 2 and a value resulting from subtracting the q-axis inductance $L_q$ from the d-axis inductance $L_d$. T is the torque, J is the inertia moment, s is the Laplace operator, D is the friction coefficient, $\omega_m$ is the mechanical angle speed, and $\theta_m$ is the mechanical angle. TL is the disturbance torque.

As shown in FIG. 2, the dotted line portion is an area in which dq-axis interference components that are mutually generated by both the q-axis current and the d-axis current are modeled. If the values of the electrical parameters of this dotted line portion are known, then compensation amounts of the d-axis voltage command value $v_d^*$ and the q-axis voltage command value $v_q^*$ can be calculated using a linear equation such that the dq-axis interference components are cancelled out.

In other words, if the value of the d-axis inductance $L_d$ and the value of the q-axis inductance $L_q$ can be estimated, then a compensation amount that cancels out the interference component can be found in advance, and thereby a state equation of the motor 102 can be linearized. In general, a d-axis compensation amount and a q-axis compensation amount are calculated by non-interference control and these compensation amounts are added to the d-axis voltage command value $v_d^*$ and the q-axis voltage command value $v_q^*$, and thereby the dq-axis interference components are canceled out.

Therefore, by estimating the values of the electrical parameters of the dotted line portion and setting these estimated values to the parameters for non-interference control, the dq-axis interference components are canceled out, and thus torque control assuming a motor model which ignores the dotted line portion can be executed. In such a control method, if errors in the estimated values of the electrical parameters of the dotted line portion become too large due to positional deviation of the permanent magnet or demagnetization, etc., control of the motor 102 may become unstable.

Thus, by measuring the electrical parameters using the detected value of the current supplied to the motor 102, the internal state of the motor 102 can be diagnosed. However, in a non-rotating state in which the rotation of the motor 102 is stopped, the operation of the voltage-type inverter 4 is stopped and the motor 102 enters a non-energized state. Therefore, the current detection value of the motor 102 becomes 0 (zero), and it becomes difficult to diagnose the internal state of the motor 102.

As a measure against the above, in the present embodiment, even if the motor 102 is in a non-rotating state, the motor 102 is energized by operating the voltage-type inverter 4 on the basis of a non-rotating voltage signal that causes a rotation speed command value $\omega_e^*$ of the motor 102 to become zero (0). Thereby, the state of the motor 102 can be diagnosed using the current detection value of the motor 102.

Figure 3:
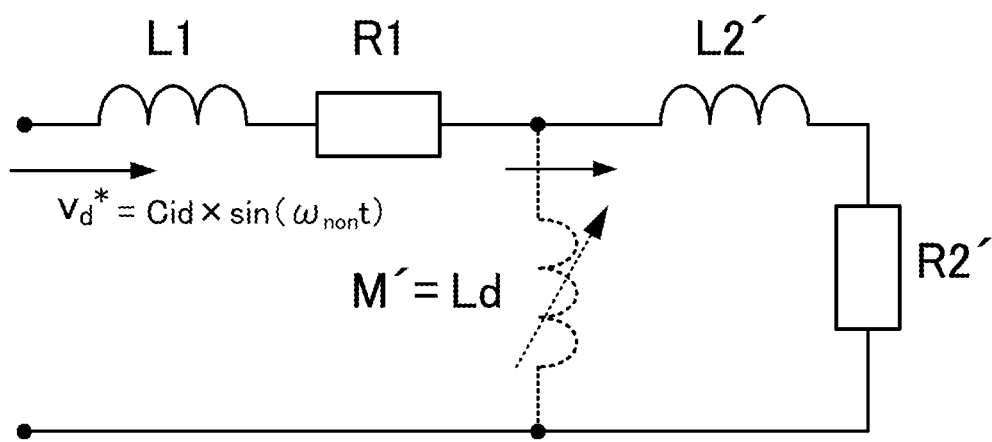
FIG. 3 is a circuit diagram illustrating the constitution of an equivalent circuit of the motor.

FIG. 3 is a circuit diagram illustrating a T-type circuit model when the motor 102 is in a non-rotating state.

In the circuit diagram shown in FIG. 3, L1 is a primary-side stator inductance of the motor 102, and R1 is a stator resistance. L2' is a value obtained by converting a secondary-side rotor inductance to a primary-side inductance value, and R2' is a value obtained by converting a rotor resistance to a primary-side resistance value.

M' (=Ld) is a value obtained by converting a mutual inductance to a primary-side inductance value. In a non-rotating state in which the rotation speed command value $\omega_e^*$ of the motor 102 becomes zero, the circuit configuration is such that there is no path to the mutual inductance.

Therefore, in a non-rotating state, the motor 102 can be diagnosed by monitoring an electrical constant Lσ, which is the sum of the stator inductance L1 and the primary-side converted value L2' of the rotor inductance, and an electrical constant Rσ, which is the sum of the stator resistance R1 and the primary-side converted value R2' of the rotor resistance.

Next, a method for generating the three-phase non-rotating voltage waveform that causes the motor 102 to enter a non-rotating state will be briefly explained.

Figure 4A:
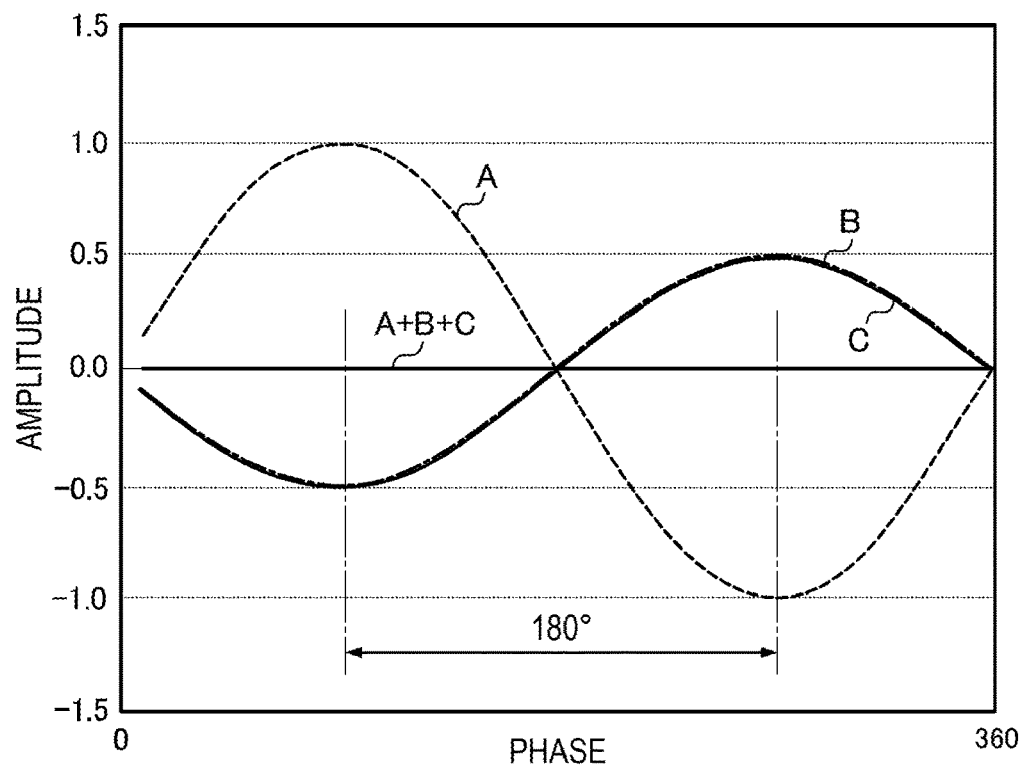
FIG. 4A is a waveform graph illustrating one example of a non-rotating voltage waveform that causes the motor to enter a non-rotating state.
Figure 4B:
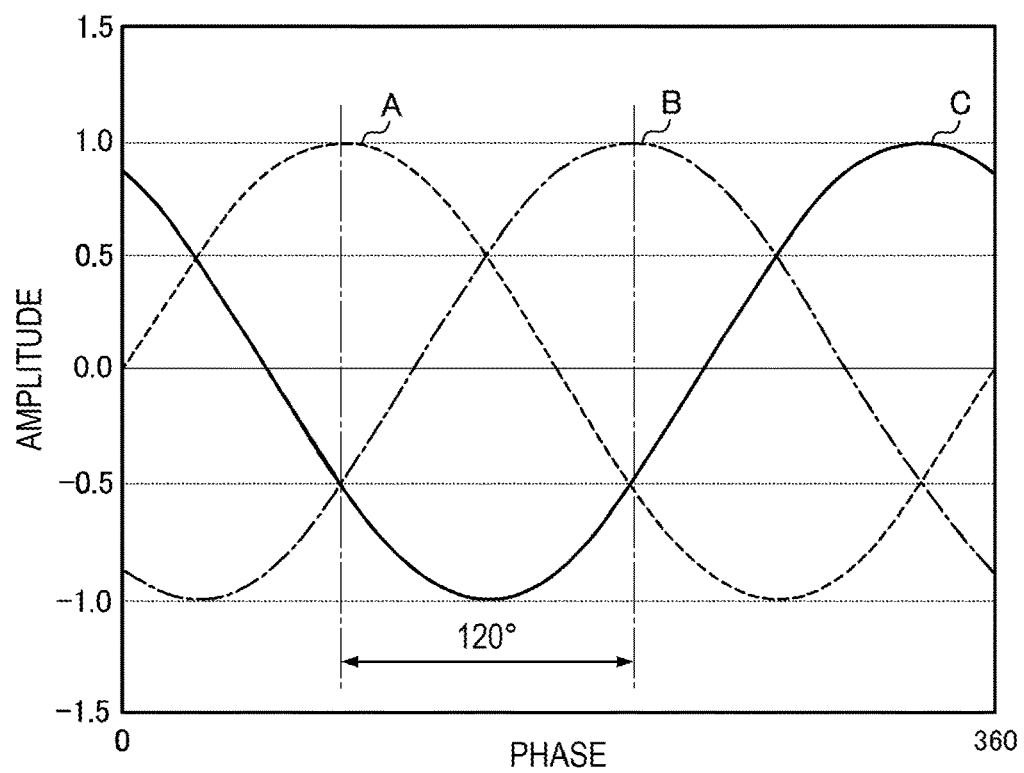
FIG. 4B is a waveform graph illustrating an example of a general voltage command waveform when the motor is rotating.

FIG. 4A illustrates one example of a three-phase non-rotating voltage waveform that causes the motor 102 to enter a non-rotating state. FIG. 4B illustrates one example of a three-phase AC voltage waveform when the motor 102 is in a rotating state.

In order to put the motor 102 into a non-rotating state in a state in which a voltage is applied to the motor 102, in the dq-axis/uvw-phase conversion equation shown below in Equation (4), it is necessary to set the three-phase voltage command values $v_u^*$, $v_v^*$, and $v_w^*$ such that the q-axis voltage command value $v_q^*$ becomes 0.

$$\begin{bmatrix} v_u^* \\ v_v^* \\ v_w^* \end{bmatrix} = \sqrt{\frac{2}{3}} \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} v_d^* \\ v_q^* \end{bmatrix} \quad (4)$$

For example, by substituting 0 for the q-axis voltage command value $v_q^*$ in the above Equation (4), the three-phase voltage command values $v_u^*$, $v_v^*$, and $v_w^*$ are set on the basis of the d-axis voltage command value $v_d^*$ as shown in Equation (5) below.

$$\begin{bmatrix} v_u^* \\ v_v^* \\ v_w^* \end{bmatrix} = \sqrt{\frac{2}{3}} \begin{bmatrix} v_d^* \\ -\frac{v_d^*}{2} \\ -\frac{v_d^*}{2} \end{bmatrix} \quad (5)$$

As shown in the above Equation (5), the sizes of the V-phase voltage command value $v_v^*$ and the W-phase voltage command value $v_w^*$ should be set to be half (½) of the U-phase voltage command value $v_u^*$. If a sine wave signal as shown in Equation (6-1) below is substituted for the d-axis voltage command value $v_d^*$ of Equation (5), the phases of the V-phase voltage command value $v_v^*$ and the W-phase voltage command value $v_w^*$ should be set to the same phase and should be set to deviate from the U-phase voltage command value $v_u^*$ by πrad(180°) as shown in Equation (6-2) below.

$$v_d^* = C_{id} \times \sin(\omega_{non} t) \quad (6\text{-}1)$$

$$-\frac{v_d^*}{2} = -\frac{1}{2} C_{id} \times \sin(\omega_{non} t) = \frac{1}{2} C_{id} \times \sin(\omega_{non} t - \pi) \quad (6\text{-}2)$$

Therefore, if a single-phase AC excitation waveform ($C_{id} \times \sin \omega t$) is input to the d-axis voltage command value $v_d^*$, a waveform in which the amplitude is halved and the phase is shifted by 180° is generated for energization of two of the phases relative to the energization of the remaining phase as shown in FIG. 4A. Thereby, the three-phase average voltage V of the motor 102 becomes 0 V, and the rotation speed command value $\omega_e^*$ becomes 0 rad/s, and thus the motor 102 can be maintained in the non-rotating state.

By implementing the above, the current supplied to the motor 102 can be detected even if the motor 102 is in a non-rotating state, and the internal state of the motor 102 can be ascertained using the detected value.

Figure 5:
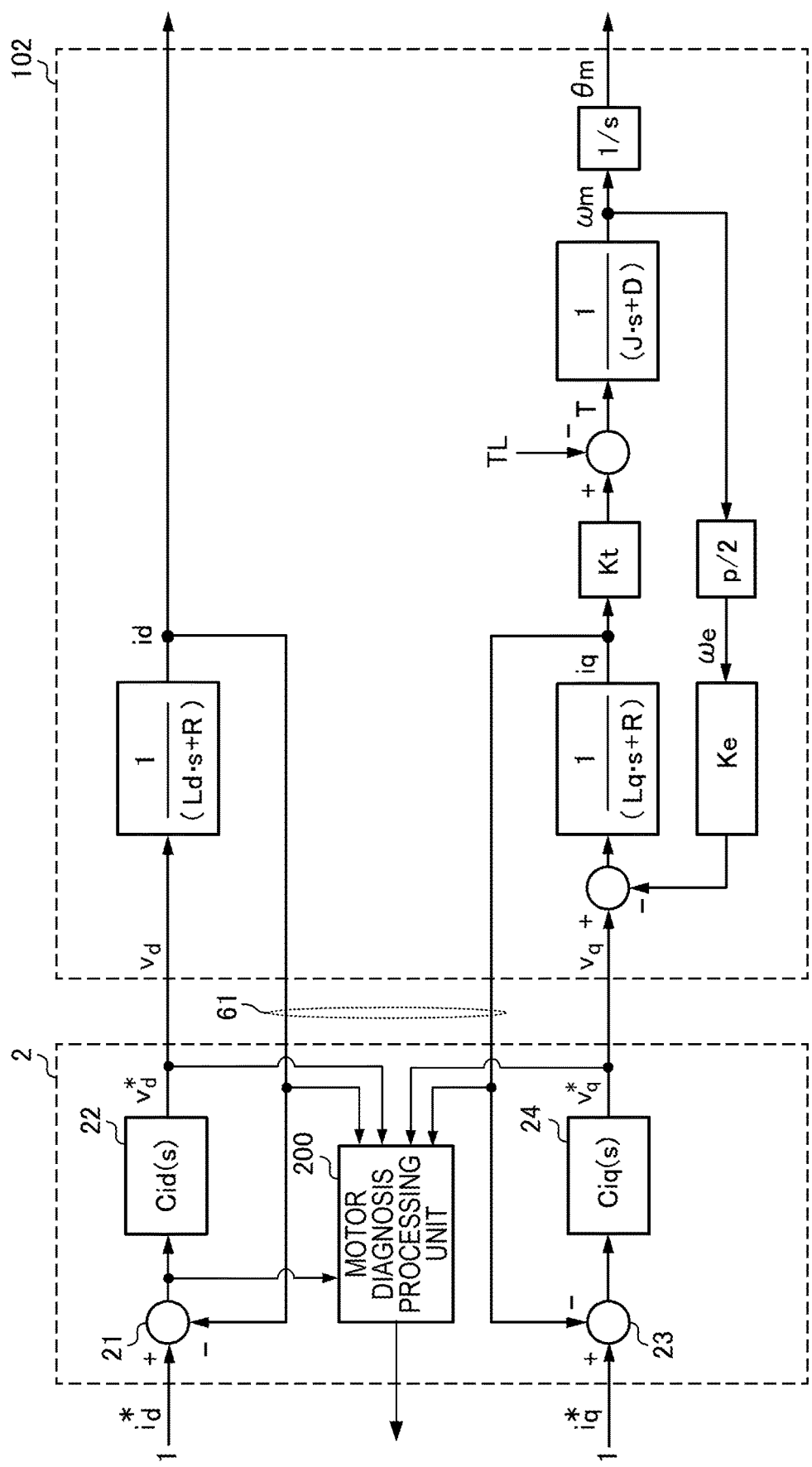
FIG. 5 is a block diagram illustrating a configurational example of a current controller of the present embodiment.

FIG. 5 is a block diagram illustrating a configurational example of the current controller 2 of the present embodiment.

In FIG. 5, the dq-axis uvw-phase converter 3, the voltage-type inverter 4, and the uvw-phase/dq-axis converter 6 have been omitted for convenience. Further, in the current controller 2, it is assumed that the d-axis current command value $i_d^*$ and the q-axis current command value $i_q^*$ which have been subjected to non-interference control by the vector controller 1 are input. Thus, in the model of the motor 102, the dq-axis interference components in the dotted line portion shown in FIG. 2 are omitted.

The current controller 2 includes the following: a d-axis current FB calculator 21; a d-axis controller 22; a q-axis current FB calculator 23; a q-axis controller 24; and a motor diagnosis processing unit 200.

The d-axis current FB calculator 21 feeds back the d-axis component of the current supplied to the motor 102 to the d-axis current command value $i_d^*$ in order to measure the internal state of the motor 102. Specifically, the d-axis current FB calculator 21 calculates a d-axis current deviation by subtracting the d-axis current detection value $i_d$ from the d-axis current command value $i_d^*$. The d-axis current FB calculator 21 outputs the d-axis current deviation to the d-axis controller 22.

The d-axis controller 22 and the q-axis controller 24 generate a non-rotating voltage command signal causing the motor 102 to enter a non-rotating state in order to diagnose the internal state of the motor 102.

In the present embodiment, the d-axis controller 22 generates the d-axis voltage command value $v_d^*$ for non-rotating diagnosis as shown in Equation (6-1). The d-axis controller 22 outputs the generated d-axis voltage command value $v_d^*$ for non-rotating diagnosis to the dq-axis/uvw-phase converter 3.

The q-axis current FB calculator 23 calculates a q-axis current deviation by subtracting the q-axis current detection value $i_q$ from the q-axis current command value $i_q^*$. The q-axis current FB calculator 23 outputs the q-axis current deviation to the q-axis controller 24.

The q-axis controller 24 generates a q-axis voltage command value $v_q^*$ for non-rotating diagnosis so that the motor 102 enters a non-rotating state, and outputs the q-axis voltage command value $v_q^*$ to the dq-axis/uvw-phase converter 3. Thereby, a d-axis component $v_d$ and a q-axis component $v_q$ of the non-rotating voltage are applied to the motor 102 from the voltage-type inverter 4 on the basis of the three-phase voltage command values $v_u^*$, $v_v^*$, and $v_w^*$ output from the dq-axis/uvw-phase converter 3.

The motor diagnosis processing unit 200 constitutes a diagnosis unit that diagnoses the internal state of the motor 102 on the basis of the detected value of the current supplied to the motor 102 in a state in which the three-phase non-rotating voltage shown in FIG. 4A is applied to the motor 102 by the voltage-type inverter 4.

In the present embodiment, the motor diagnosis processing unit 200 diagnoses an electrical characteristic such as a reactance component or a resistance component of the motor 102 using the q-axis voltage command value $v_q^*$ from the d-axis controller 22, the d-axis current detection value $i_d$ from the uvw-phase/dq-axis converter 6, and the d-axis current deviation from the d-axis current FB calculator 21. The motor diagnosis processing unit 200 sends the diagnosis result to the controller (not illustrated).

Figure 6:
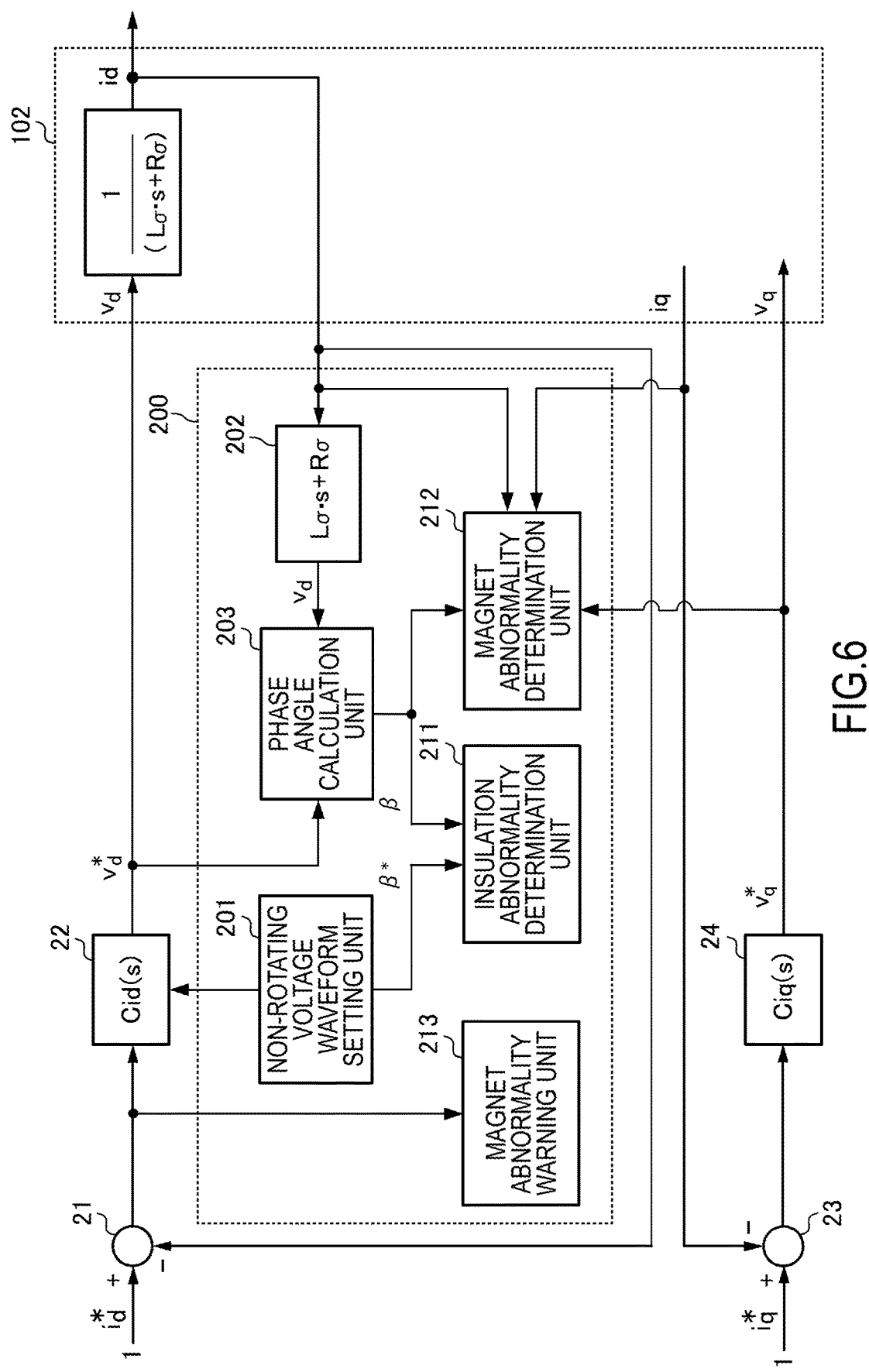
FIG. 6 is a block diagram illustrating a configurational example of a motor diagnosis processing unit that diagnoses an internal state of the motor.

FIG. 6 is a block diagram illustrating a detailed configurational example of the motor diagnosis processing unit 200.

Herein, since the motor 102 of the present embodiment is an IPM motor, the q-axis inductance $L_q$ is smaller than the d-axis inductance $L_d$. Thus, the d-axis inductance $L_d$ is regarded as the electrical constant $L\sigma$ ($=\sqrt{(L_d^2 + L_q^2)}$), and the armature resistance R is regarded as the electrical constant $R\sigma$.

The motor diagnosis processing unit 200 includes the following: a non-rotating voltage waveform setting unit 201; a transfer function 202; a phase angle calculation unit 203; an insulation abnormality determination unit 211; a magnet abnormality determination unit 212; and a magnet abnormality warning unit 213.

The non-rotating voltage waveform setting unit 201 sets the waveforms of the d-axis voltage command value $v_d^*$ and the q-axis voltage command value $v_q^*$ for non-rotating diagnosis as the non-rotating voltage signal generated by the d-axis controller 22 and the q-axis controller 24. For example, the non-rotating voltage waveform setting unit 201 sets the amplitude, angular frequency, phase angle, and the like of the non-rotating voltage signal.

The non-rotating voltage waveform setting unit 201 sets an angular frequency $\omega_{non}$ and an amplitude $C_{id}$ of the voltage command value $v_d^*$ as parameters related to the d-axis voltage command value $v_d^*$ for non-rotating diagnosis that is output from the d-axis controller 22. Further, the non-rotating voltage waveform setting unit 201 calculates a setting value $\beta^*$ of the electrical angle defined by the voltage command value $v_d^*$ for non-rotating diagnosis, and outputs the setting value $\beta^*$ to the insulation abnormality determination unit 211 and the magnet abnormality determination unit 212.

The transfer function 202 inputs the d-axis current detection value $i_d$ and performs filter processing as shown in Equation (7) below, and thereby outputs the d-axis voltage detection value $v_d$.

$$v_d = (L_d \cdot s + R_\alpha) \times i_d \tag{7}$$

Herein, if the steady state of the motor 102 is measured assuming that the d-axis voltage detection value $v_d$ shown in Equation (7) and the d-axis voltage command value $v_d^*$ shown in Equation (6-1) are equal to each other, electrical constants $\omega_{non}L\sigma$ and $R\sigma$ can be calculated as shown below in Equations (8-1) and (8-2).

$$\omega_{non}L_a = -\frac{1}{C_{id}} \times \frac{1}{T} \times \int i_d \cos(\omega_{non}t)\, dt \tag{8-1}$$

$$R_a = -\frac{1}{C_{id}} \times \frac{1}{T} \times \int i_d \sin(\omega_{non}t)\, dt \tag{8-2}$$

In the above, T is an integration period, and is set, for example, on the basis of the angular frequency $\omega_{non}$.

The phase angle calculation unit 203 calculates the electrical constants $\omega_{non}L\sigma$ and $R\sigma$ of the motor 102 according to the above Equations (8-1) and (8-2). By calculating the electrical constants $\omega_{non}L\sigma$ and $R\sigma$ at a predetermined sampling period, the phase angle calculation unit 203 calculates a current phase $\omega_{non}t$ as shown below in Equation (9).

$$\omega_{non}t = \arctan\left(\frac{\omega_{non}L_a}{R_e}\right) = \beta \tag{9}$$

Figure 7:
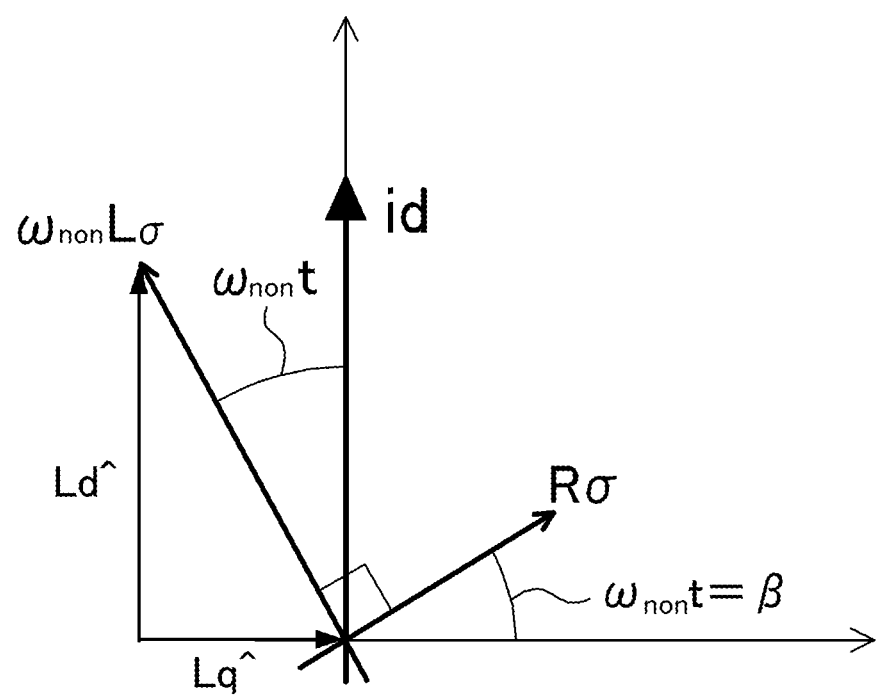
FIG. 7 explains a calculation method for calculating a phase angle $\beta$ on the basis of an electric constant of the motor.

Herein, as shown in FIG. 7, the current phase $\omega_{non}t$ can be regarded as the phase angle $\beta$, and thus the phase angle calculation unit 203 outputs the current phase $\omega_{non}t$ as a measurement value $\beta$ of the phase angle to the insulation abnormality determination unit 211.

The insulation abnormality determination lit it 211 determines the insulation state of the coils formed in the motor 102 on the basis of the d-axis current detection value $i_d$ of the motor 102.

The insulation abnormality determination unit 211 acquires the setting value $\beta^*$ of the electrical angle from the non-rotating voltage waveform setting unit 201, and acquires the measurement value $\beta$ of the electrical angle from the phase angle calculation unit 203. The insulation abnormality determination unit 211 determines whether the absolute value of the difference between the setting value $\beta^*$ and the measurement value $\beta$ of the electrical angle is less than a predetermined defined value. The defined value is an upper limit of an allowable deviation range during normal operation, and for example, the defined value is set using 0 as a reference and adding a fixed value considering errors, etc.

If the absolute value of the difference between the setting value $\beta^*$ and the measurement value $\beta$ of the electrical angle is equal to or greater than the defined value, the insulation abnormality determination unit 211 deters that there is an insulation abnormality in the motor 102. The reason for determining in this way is that if an electrical short circuit occurs within the motor 102, the reactance component or resistance component of the motor 102 decreases, and thus the measurement value $\beta$ of the phase angle fluctuates greatly.

On the other hand, if the absolute value of the difference between the setting value $\beta^*$ and the measurement value $\beta$ of the electrical angle is less than the defined value, the insulation abnormality determination unit 211 determines that an insulation abnormality is not occurring in the motor 102. The insulation abnormality determination unit 211 sends the determination result to the controller (not illustrated).

In this way, by comparing the setting value $\beta^*$ of the electrical angle during the normal operation and the measurement value $\beta$ calculated by the phase angle calculation unit 203, electrical insulation failures of the motor 102 can be determined. In other words, abnormalities in the electrical characteristics of the motor 102 can be determined by applying the non-rotating voltage to the motor 102 and detecting the current supplied to the motor 102.

The magnet abnormality determination unit 212 determines abnormalities in the magnetic characteristics of the motor 102 on the basis of the d-axis current detection value $i_d$ of the motor 102.

The magnet abnormality determination unit 212 acquires the measurement value $\beta$ of the phase angle from the phase angle calculation unit 203, and uses Equations (10-1) and (10-2) below to calculate the d-axis inductance $L_d$ and the q-axis inductance $L_q$.

$$L_d = L_\sigma \cos \beta \tag{10-1}$$

$$L_q = L_\sigma \sin \beta \tag{10-2}$$

Since the stator inductance L1 is not included in the electrical constant L$\sigma$, strictly speaking, $L_d \approx L\sigma \sin \beta$, $L_q \approx L\sigma \sin \beta$. However, the magnet abnormality determination unit 212 diagnoses abnormalities of the motor 102 on the basis of the fluctuation amount of the measurement parameters, and thus even if the d-axis inductance $L_d$ and the q-axis inductance $L_q$ are calculated using the above Equations (10-1) and (10-2), any effect thereof on the diagnosis accuracy is minor.

The magnet abnormality determination unit 212 calculates, on the basis of the calculated d-axis inductance $L_d$, a frequency characteristic $K_e(\omega_{non})$ related to the measurement value of the induction voltage constant.

From the relationship in the following Equation (11), the induction voltage constant $K_e$ can be measured using the d-axis inductance $L_d$, the q-axis voltage command value $v_q^*$ for non-rotating diagnosis, a setting value $\omega_{non}^*$ of the angular frequency of the q-axis voltage command value $v_q^*$, the d-axis current detection value $i_d$, and the q-axis current detection value $i_q$. In the following, A is a constant.

$$K_e \times A \times L_d \times i_d = \frac{v_q^*}{\omega_{non}^*} \times \frac{i_d^2}{i_d^2 + i_q^2} \quad (11)$$

In the present embodiment, the magnet abnormality determination unit 212 acquires the setting value $\omega_{non}$ of the angular frequency from the non-rotating voltage waveform setting unit 201, acquires the q-axis voltage command value $v_q^*$ for non-rotating diagnosis from the q-axis controller 24, and acquires the d-axis current detection value $i_d$ and the q-axis current detection value $i_q$. The magnet abnormality determination unit 212 then calculates the measurement value $K_e$ of the induction voltage constant using the d-axis inductance $L_d$, the q-axis voltage command value $v_q^*$ for non-rotating diagnosis, the setting value $\omega_{non}^*$ of the angular frequency of the q-axis voltage command value $v_q^*$, the d-axis current detection value $i_d$, and the q-axis current detection value $i_q$ as shown below in Equation (12).

$$K_e(\omega_{non}) = \frac{v_q^*}{\omega_{non}^*} \times \frac{i_d^2}{i_d^2 + i_q^2} \times \frac{1}{A \times L_d \times i_d} \quad (12)$$

Upon calculating the measurement value $K_e$ of the induction voltage constant, the magnet abnormality determination unit 212 changes the setting value of the angular frequency $\omega_{non}^*$ generated by the non-rotating voltage waveform setting unit 201 so that the setting value $\omega_{non}^*$ of the angular frequency of the d-axis voltage command value $v_d^*$ is increased or decreased by a predetermined step width. By calculating the measurement value $K_e$ of the induction voltage constant every time the setting value $\omega_{non}^*$ of the angular frequency is changed, the magnet abnormality determination unit 212 calculates the frequency characteristic $K_e(\omega_{non})$ related to the measurement value of the induction voltage constant.

The magnet abnormality determination unit 212 acquires the frequency characteristic $K_e(\omega_{non})^*$ related to the setting value of the induction voltage constant, and finds the difference (deviation) between the frequency characteristic $K_e(\omega_{non})^*$ of the setting value and the frequency characteristic $K_e(\omega_{non})$ of the measurement value for the induction voltage constant.

The magnet abnormality determination unit 212 calculates the absolute value of the deviation between the setting value $K_e^*$ and the measurement value $K_e$ of the induction voltage constant at each angular frequency $\omega_{non}$, and takes the sum of the absolute values of the deviation calculated at each angular frequency $\omega_{non}$. The magnet abnormality determination unit 212 then determines whether the sum of the absolute values of the deviation of the induction voltage constant $K_e$ is greater than a predetermined second defined value $D_{th2}$ as shown in Equation (13) below. This defined value is determined considering the amount of fluctuation in the deviation during normal operation, and is set to, for example, a value to which error, etc. has been added.

$$\sum_{\omega_{non}} |K_e(\omega_{non})^* - K_e(\omega_{non})| < D_{th2} \quad (13)$$

If the absolute value of the deviation of the induction voltage constant $K_e$ is equal to or greater than the second defined value $D_{th2}$, the magnet abnormality determination unit 212 determines that there is an abnormality in the permanent magnet of the motor 102. On the other hand, if the absolute value of the deviation of the induction voltage constant $K_e$ is less than the second defined value $D_{th2}$, the magnet abnormality determination unit 212 determines that there is no abnormality in the permanent magnet of the motor 102. The magnet abnormality determination unit 212 sends the determination result to the controller (not illustrated).

In this way, by finding the amount of fluctuation of the frequency characteristic $K_e(\omega_{non})$ of the measurement value relative to the frequency characteristic $K_e(\omega_{non})^*$ of the setting value for the induction voltage constant, abnormalities in the electrical or magnetic characteristics of the motor 102 can be determined. Similar to the calculation process for the induction voltage constant $K_e$ described above, abnormalities in the magnetic characteristics of the motor 102 may be determined by comparing the frequency characteristic $\beta(\omega_{non})^*$ of the setting value and the frequency characteristic $\beta(\omega_{non})$ of the measurement value for the phase angle of the motor 102.

The magnet abnormality warning unit 213 issues a warning that there may be an abnormality in the magnetic characteristics of the motor 102 on the basis of the d-axis current command value $i_d^*$ and the d-axis current detection value $i_d$.

The magnet abnormality warning unit 213 of the present embodiment determines, on the basis of the d-axis current deviation from the d-axis current FB calculator 21, whether there is a high possibility of an abnormality in the magnetic characteristics of the motor 102. For example, if the d-axis current deviation is smaller than a predetermined defined value, the magnet abnormality warning unit 213 determines that there is no abnormality in the magnetic characteristics of the motor 102.

On the other hand, if the d-axis current deviation is equal to or greater than a defined value, the magnet abnormality warning unit 213 determines that there is a high possibility of an abnormality in the magnetic characteristics of the motor 102. The reason for determining in this way is that there is a correlation between the d-axis current deviation and the ratio ($L_d/L_q$) of the d-axis inductance $L_d$ relative to the q-axis inductance $L_q$, and the possibility of an abnormality in the magnetic characteristics increases as the d-axis current deviation increases. If it is determined that there is a high possibility of an abnormality in the magnetic characteristics, the magnet abnormality warning unit 213 sends warning information indicating this high possibility to the controller (not illustrated).

Figure 8:
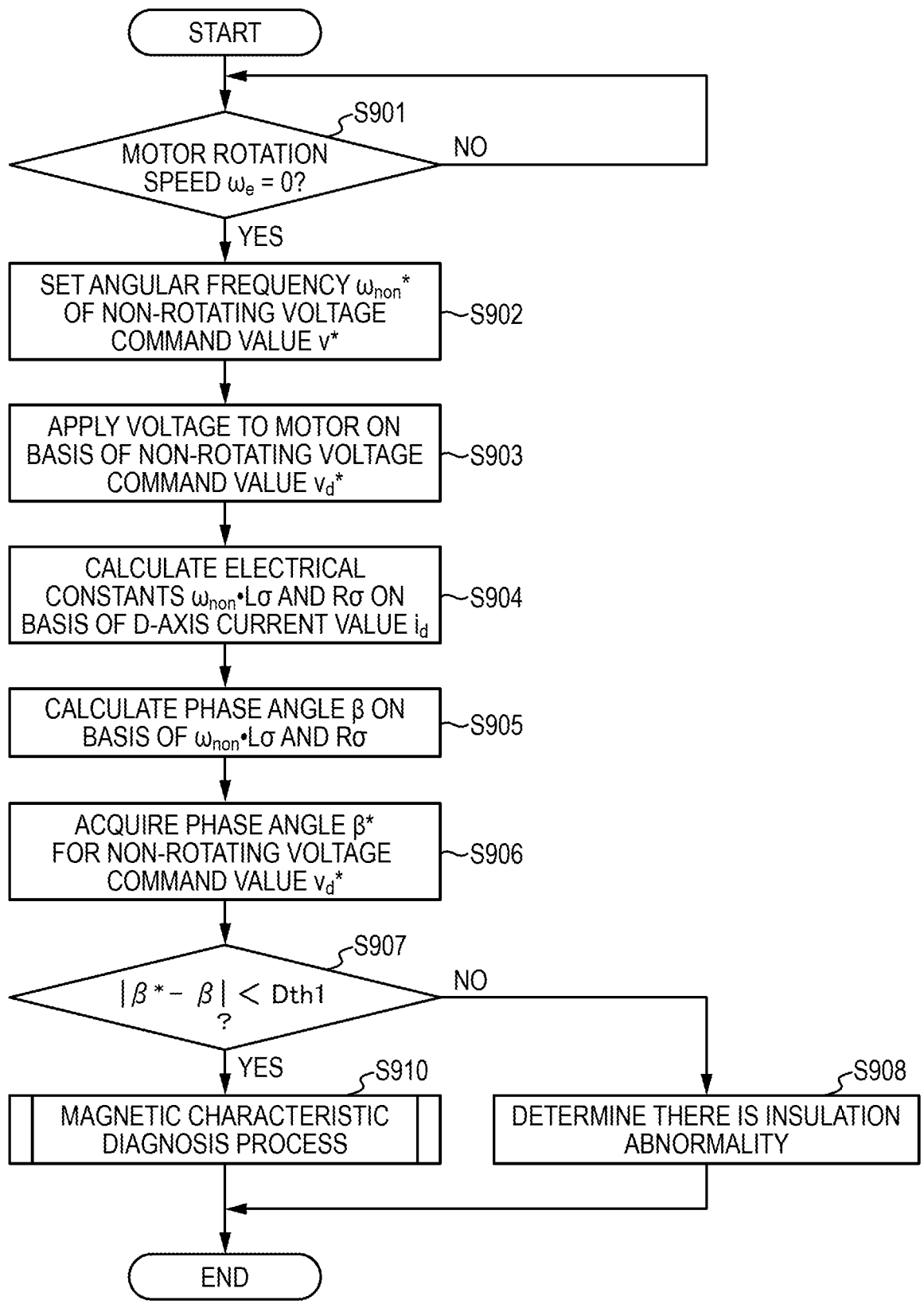
FIG. 8 is a flowchart illustrating one example of a diagnosis method for diagnosing the characteristics of the motor in a non-rotating state.

FIG. 8 is a flowchart illustrating a processing procedure example related to the diagnosis method for diagnosing the internal state of the motor 102 performed by the motor diagnosis processing unit 200.

In step S901, the motor diagnosis processing unit 200 determines whether the rotation speed command value $\omega_e^*$ of the motor 102 is 0. In other words, the motor diagnosis processing unit 200 determines whether the motor 102 is in a non-rotating state in which the rotation of the motor 102 is stopped. In this example, it is determined whether the motor 102 is in a non-rotating state using the rotation speed command value $\omega_e^*$, but the detection value $\omega_e$ calculated by the rotation speed calculator 8 may also be used.

In step S902, the motor diagnosis processing unit 200 sets the angular frequency $\omega_{non}^*$ and the amplitudes $C_{id}$ and $C_{iq}$ of the non-rotating voltage command signal.

The motor diagnosis processing unit 200 of the present embodiment sets the angular frequency $\omega_{non}^*$ and the amplitude $C_{id}$ of the d-axis voltage command value $v_d^*$ for non-rotating diagnosis shown in Equation (6-1) to predetermined values, and sets the q-axis voltage command value $v_q^*$ for non-rotating diagnosis to, for example, 0 (zero) V.

In step S903, the voltage-type inverter 4 applies to the motor 102 the three-phase AC voltage shown in FIG. 4A as a non-rotating voltage on the basis of the d-axis voltage command value $v_d^*$ for non-rotating diagnosis.

In steps S904 to S908, the motor diagnosis processing unit 200 executes an electrical characteristic diagnosis process for diagnosing an electrical characteristic of the motor 102 on the basis of the current supplied to the motor 102, to which the non-rotating voltage signal has been applied.

In step S904, the motor diagnosis processing unit 200 acquires the d-axis current detection value $i_d$ of the motor 102 from the uvw-phase/dq-axis converter 6, and calculates the d-axis voltage detection value $v_d$ according to Equation (7) on the basis of the d-axis current detection value $i_d$. The motor diagnosis processing unit 200 calculates the electrical constants $\omega_{non}L\sigma$ and $R\sigma$ according to Equations (8-1) and (8-2) on the basis of the calculated d-axis voltage detection value $v_d$ and the d-axis voltage command value $v_d^*$ shown in Equation (6-1).

In step S905, the motor diagnosis processing unit 200 calculates the measurement value p of the phase angle according to Equation (9) on the basis of the calculated electrical constants $\omega_{non}L\sigma$ and $R\sigma$.

In step S906, the motor diagnosis processing unit 200 acquires the setting value $\beta^*$ of the phase angle defined by the non-rotating voltage command signal $v^*$.

In step S907, the motor diagnosis processing unit 200 determines whether the absolute value of the difference between the setting value $\beta^*$ and the measurement value $\beta$ of the phase angle (the deviation of the phase angle $\beta$) is smaller than a first defined value $D_{th1}$. The first defined value $D_{th1}$ is determined considering the amount of fluctuation in the deviation during normal operation, and is set to, for example, a value to which error, etc. has been added using 0 as a reference.

In step S908, if the absolute value of the deviation of the phase angle $\beta$ is equal to or greater than the first defined value $D_{th1}$, the motor diagnosis processing unit 200 determines that a coil of the motor 102 has short circuited, i.e. that an insulation abnormality is occurring, and terminates the diagnosis method of the motor 102.

On the other hand, in step S910, if the absolute value of the deviation of the phase angle $\beta$ is smaller than the first defined value $D_{th1}$, the motor diagnosis processing unit 200 determines that there are no insulation abnormalities in the motor 102, and subsequently executes a magnetic characteristic diagnosis process for diagnosing abnormalities in the magnetic characteristics of the motor 102. Once the process of step S910 has finished, the series of processing procedures for the diagnosis method of the motor 102 of the present embodiment is complete.

Figure 9:
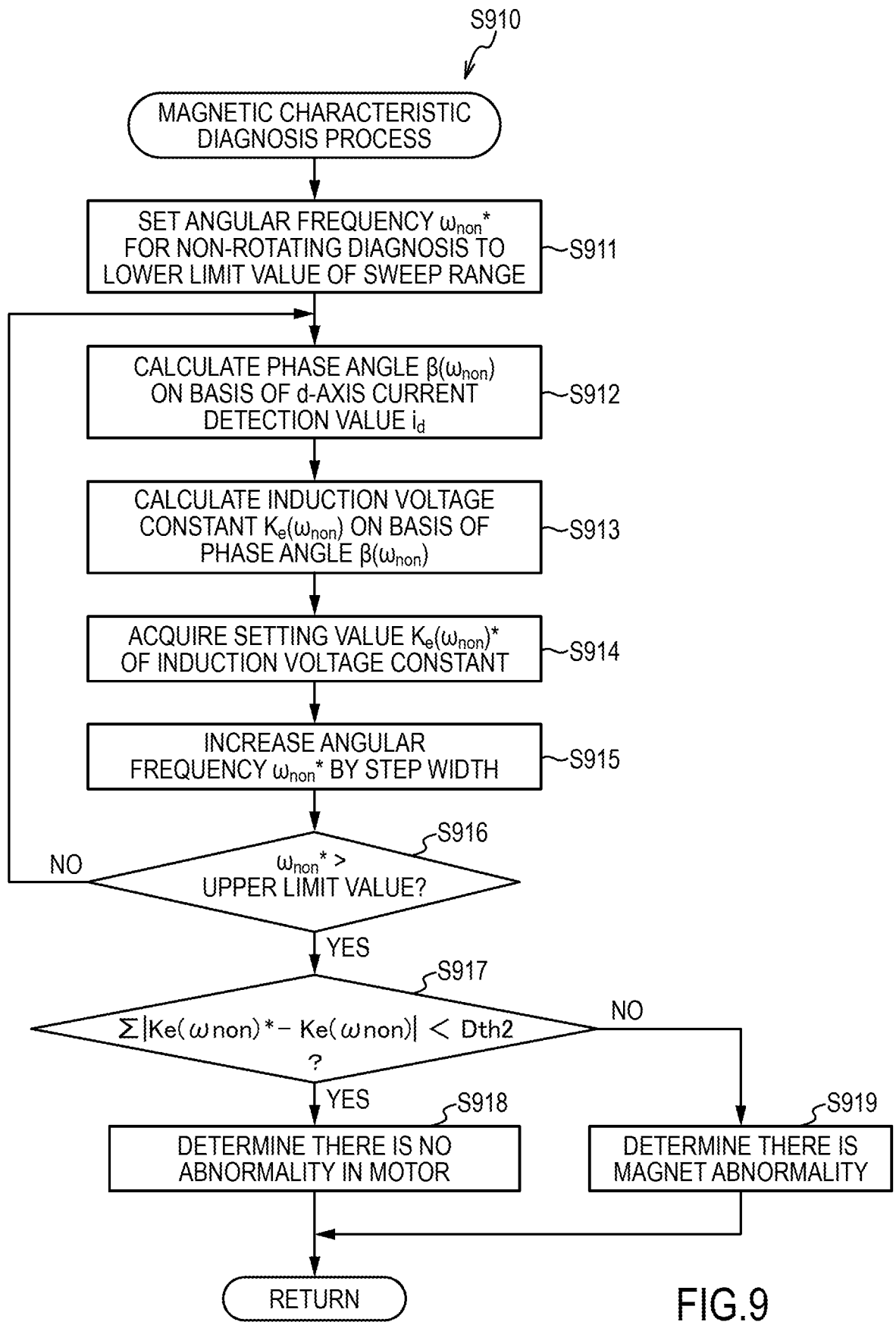
FIG. 9 is a flowchart illustrating one example of a magnetic characteristic diagnosis process for diagnosing a magnetic characteristic of the motor.

FIG. 9 is a flowchart illustrating one example of the magnetic characteristic diagnosis process executed in step S910.

In step S911, the motor diagnosis processing unit 200 sets the angular frequency $\omega_{non}^*$ for non-rotating diagnosis to an initial value. As the initial value, the angular frequency $\omega_{non}^*$ is set to the lower limit value of the sweep range (change range) of the angular frequency $\omega_{non}^*$.

In step S912, the motor diagnosis processing unit 200 calculates the measurement value $\beta(\omega_{non})$ of the phase angle on the basis of the d-axis current detection value $i_d$ similar to the processes of steps S904 to S906 described above.

In step S913, the motor diagnosis processing unit 200 calculates the measurement value $K_e(\omega_{non})$ of the induction voltage constant on the basis of the calculated measurement value $\beta(\omega_{non})$ of the phase angle.

The motor diagnosis processing unit 200 of the present embodiment calculates the d-axis inductance $L_d$ according to Equation (10-1) on the basis of the measurement value $\beta(\omega_{non})$ of the phase angle. The motor diagnosis processing unit 200 then calculates the measurement value $K_e(\omega_{non})$ of the induction voltage constant by substituting the calculated d-axis inductance $L_d$, the d-axis current detection value $i_d$, the q-axis current detection value $i_q$, the q-axis voltage command value $v_q^*$, and the angular frequency $\omega_{non}$ for non-rotating diagnosis into Equation (11).

In step S914, the motor diagnosis processing unit 200 acquires the setting value $K_e(\omega_{non})^*$ of the induction voltage constant at the angular frequency $\omega_{non}$ for non-rotating diagnosis. Therefore, the motor diagnosis processing unit 200 stores the measurement value $K_e$ and the setting value $K_e^*$ of the induction voltage constant at the angular frequency $\omega_{non}$ in a memory, respectively.

In step S915, the motor diagnosis processing unit 200 increases the value of the angular frequency $\omega_{non}$, for non-rotating diagnosis by a predetermined step width.

In step S916, the motor diagnosis processing unit 200 determines whether the angular frequency $\omega_{non}$ which has been increased by the step width is greater than the upper limit of the sweep range. If the angular frequency $\omega_{non}$ is equal to or less than the upper limit of the change range, the motor diagnosis processing unit 200 changes the value of the angular frequency $\omega_{non}$ set in both the d-axis controller 22 and the q-axis controller 24 by the step width.

The motor diagnosis processing unit 200 repeats the series of processes from step S912 to step S916 until the angular frequency $\omega_{non}$ becomes greater than the upper limit of the change range. In other words, the motor diagnosis processing unit 200 changes, in a step-wise manner, the angular frequency $\omega_{non}$ of the d-axis voltage command value $v_d^*$ for non-rotating diagnosis. The motor diagnosis processing unit 200 calculates the measurement value $K_e(\omega_{non})$ and the setting value $K_e(\omega_{non})^*$ of the induction voltage constant every time the angular frequency $\omega_{non}$ is changed, and associates these values with the angular frequency $\omega_{non}$ and stores them in the memory, respectively. Therefore, the frequency characteristic $K_e(\omega_{non})$ of the measurement value and the frequency characteristic $K_e(\omega_{non})^*$ of the setting value for the induction voltage constant are stored together in the memory.

In step S917, the motor diagnosis processing unit 200 compares the frequency characteristic $K_e(\omega_{non})$ of the measurement value and the frequency characteristic $K_e(\omega_{non})^*$ of the setting value for the induction voltage constant.

The motor diagnosis processing unit 200 of the present embodiment finds the absolute value of the difference between the measurement value $K_e$ and the setting value $K_e^*$ for the induction voltage constant (the deviation of the induction voltage constant $K_e$) at each angular frequency $\omega_{non}$, and determines whether the sum of these absolute values is smaller than the second defined value $D_{th2}$ as shown in Equation (13) above.

In step S918, if the sum of the absolute values of the deviation of the induction voltage constant $R_e$ at each angular frequency $\omega_{non}$ is smaller than the second defined value $D_{th2}$, the motor diagnosis processing unit 200 determines that there are no electrical or magnetic abnormalities in the motor 102.

In step S919, if the sum of the absolute values of the deviation of the induction voltage constant $K_e$ at each angular frequency $\omega_{non}$ is equal to or greater than the second defined value $D_{th2}$, the motor diagnosis processing unit 200 determines that there is an abnormality in the magnetic characteristics of the permanent magnet of the motor 102.

Determinations by the motor diagnosis processing unit 200 that the magnetic characteristics are abnormal include, for example, the case in which the position of the permanent magnet of the motor 102 has deviated, the case in which the temperature of the permanent magnet has risen too high and the permanent magnet has demagnetized, deterioration over time, and the like.

Once the process of step S918 or S919 has finished, the diagnosis processing unit 200 sends the determination result to the controller (not illustrated), and the series of processing procedures for the magnetic characteristic diagnosis process is complete.

According to the first embodiment of the present invention, the diagnosis method for diagnosing the internal state of the motor 102 includes step S903, in which a voltage is applied to the motor 102 on the basis of the non-rotating voltage signal $v_d*$ that causes the rotation speed $\omega_e*$ of the motor 102 to become 0, and step S904, in which the current $i_d$ to be supplied to the motor 102 in a state in which the voltage is applied to the motor 102 is acquired. Further, the diagnosis method includes step S905 or S913, in which the electrical constant $L\sigma$ of the reactance component or the electrical constant $R\sigma$ of the resistance component, which are electrical characteristics of the motor 102, is calculated on the basis of the current $i_d$ of the motor 102 acquired in step S904.

This diagnosis method includes step S907 or S917, in which abnormalities of the motor 102 are determined on the basis of the electrical characteristics of the motor 102 calculated in step S905 and the phase angle or the induction voltage constant $K_e$, which are parameters related to the setting value of the non-rotating voltage signal $v_d*$.

In this way, in the control method of the motor of the present embodiment, a power converter such as the voltage-type inverter 4 is operated to energize the motor 102 using a command waveform in which the control rotation speed of the motor shaft is 0, and a current supplied to the motor 102 is detected. Thereby, the electrical and magnetic characteristics of the motor 102 can be diagnosed in a state in which the voltage-type inverter 4 is connected to the motor 102.

In particular, in this diagnosis method, the internal state of the motor 102 can be diagnosed even in a non-rotating state in which the rotation of the motor 102 is stopped. Therefore, even in a state in which the motor 102 cannot be rotated or a state in which it is unclear whether the motor 102 can be rotated, the electrical characteristics or magnetic characteristics of the motor 102 which are necessary for diagnosis can be acquired. Thus, since it is not necessary to forcibly rotate the motor 102, abnormalities of the motor 102 can be diagnosed without applying an excessive load on the power converter and the like. In other words, the internal state of the motor 102 can be diagnosed while suppressing failure of the power conversion device 100.

Further, in the diagnosis method of the present embodiment, the angular frequency $\omega_{non}$ of the non-rotating voltage signal $v_d*$ is changed in step S915, and the frequency characteristic $K_e(\omega_{non})$ related to the electrical characteristics of the motor 102 is calculated in step S913. In addition, in this diagnosis method, abnormalities of the permanent magnet provided to the motor 102 are determined on the basis of the calculated value $K_e(\omega_{non})$ of the frequency characteristic and the setting value $K_e(\omega_{non})*$ of the parameter in step S917.

In this way, by changing the setting value $\omega_{non}*$ of the angular frequency of the non-rotating voltage signal $v_d$ and measuring the parameter of the motor 102, a gain $R_e$ of the induction voltage constant, which is a control parameter of the magnetic characteristics in a non-rotating state, can be extracted at each angular frequency $\omega_{non}$. Thereby, the frequency dependent characteristics related to the magnetic characteristics of the motor 102 can be ascertained, and thus abnormalities of the motor 102 can be more accurately detected.

In the present embodiment, an example was explained in which the internal state of the motor 102 is diagnosed when the motor 102 has entered a non-rotating state. However, the internal state of the motor 102 can be diagnosed even if the motor 102 is in a rotating state. In the following, a method for diagnosing the motor 102 when the motor 102 is in a rotating state will be explained.

Second Embodiment

Figure 10:
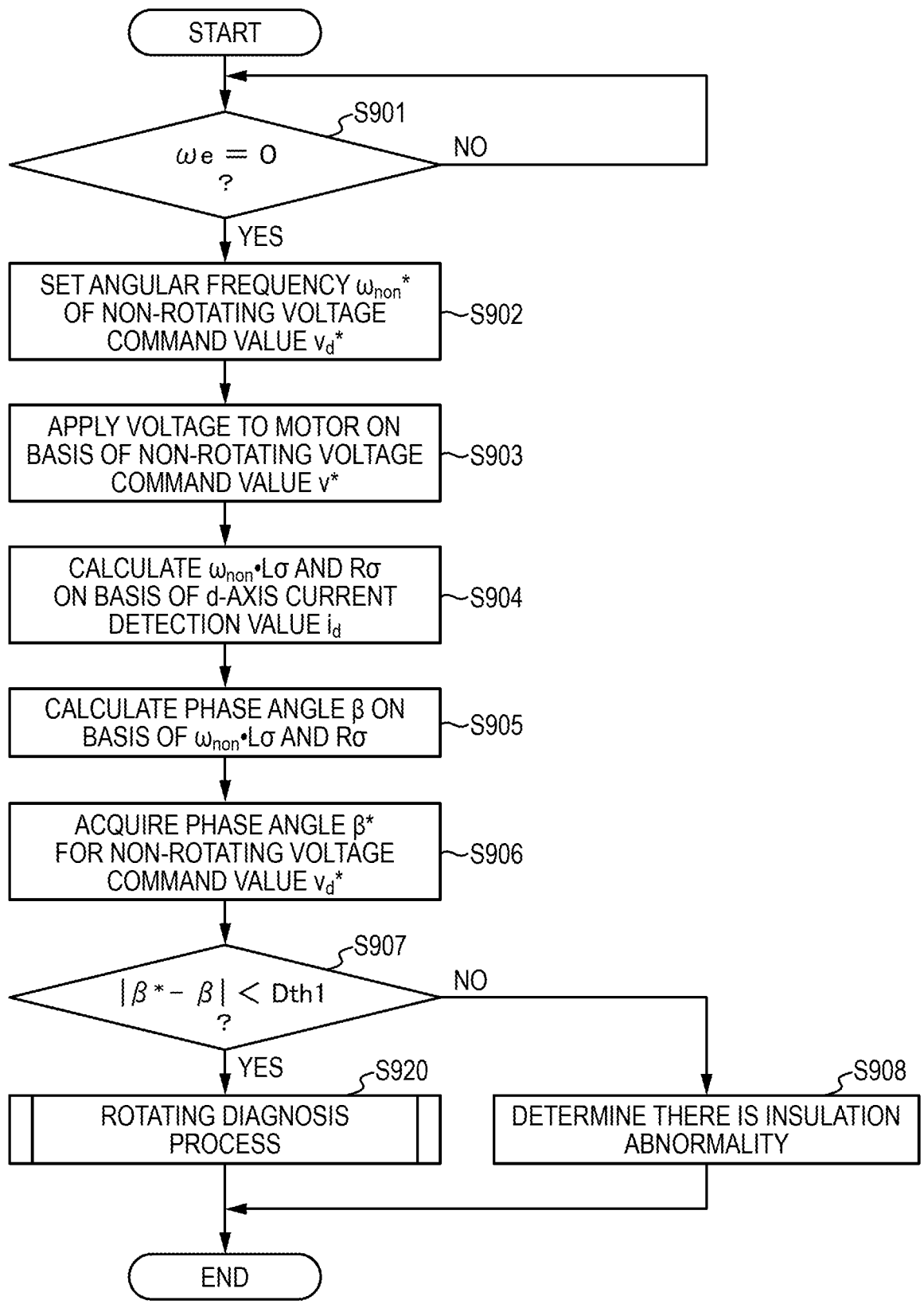
FIG. 10 is a flowchart illustrating one example of motor diagnosis method according to a second embodiment of the present invention.

FIG. 10 is a flowchart illustrating a processing procedure example related to a diagnosis method of the motor 102 according to a second embodiment of the present invention.

In the diagnosis method of this embodiment, the process of step S910 of the diagnosis method shown in FIG. 8 is replaced with the process of step S920. The processing content besides step S920 is the same as the processing content shown in FIG. 8, and thus the steps will be assigned the same reference numerals and explanations thereof will be omitted.

In step S920, if the absolute value of the deviation of the phase angle $\beta$ is smaller than the first defined value $D_{th1}$, the motor diagnosis processing unit 200 determines that there are no insulation abnormalities, and subsequently executes a rotating diagnosis process for diagnosing the internal state of the motor 102 when the motor 102 is in a rotating state.

Figure 11:
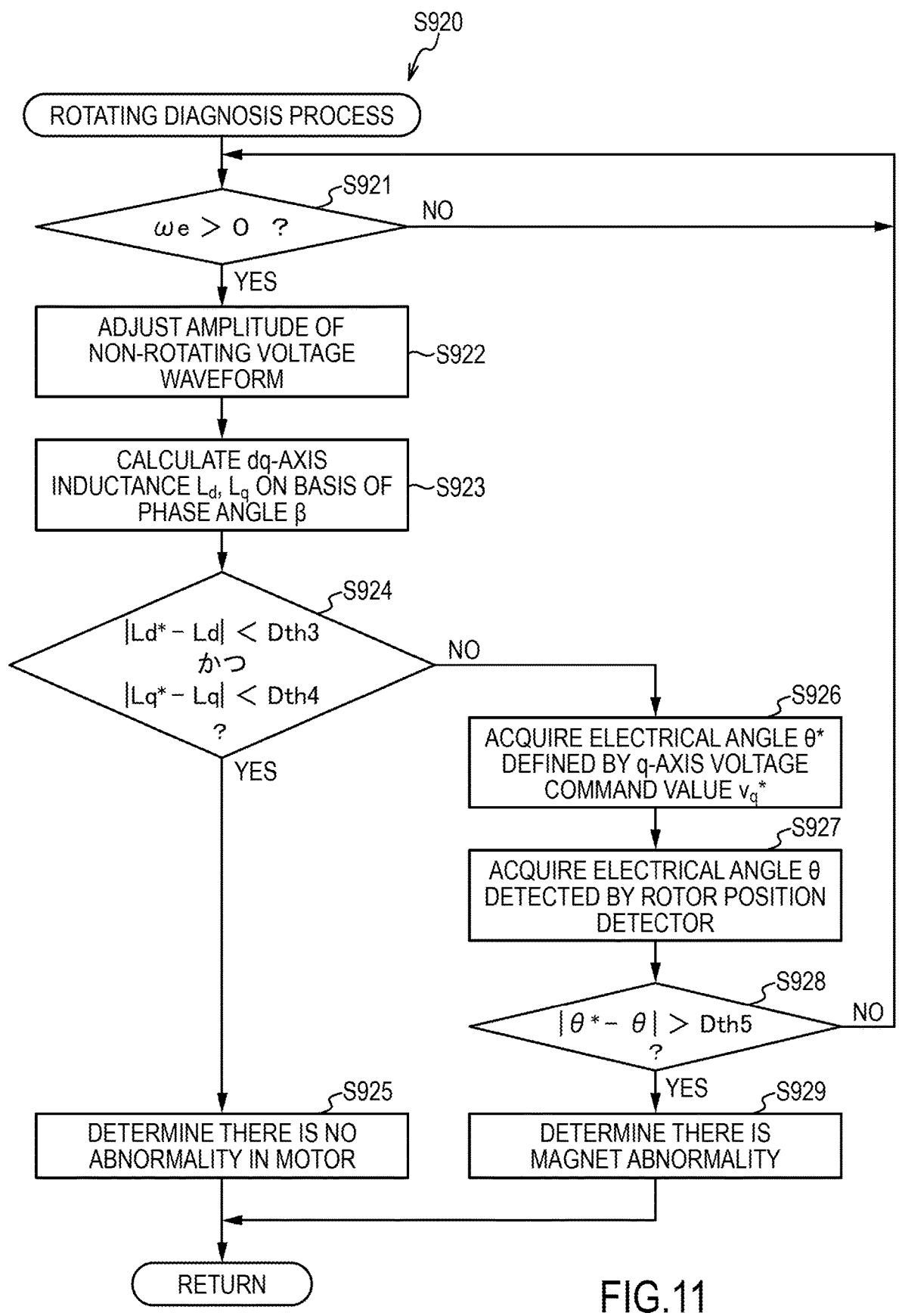
FIG. 11 is a flowchart illustrating one example of a rotating diagnosis process for diagnosing the characteristics of the motor in a rotating state.

FIG. 11 is a flowchart illustrating an example of the rotating diagnosis process executed in step S920.

In step S921, the motor diagnosis processing unit 200 determines whether the rotation speed $\omega e$ of the motor 102 is greater than zero (0). In other words, the motor diagnosis processing unit 200 determines whether the motor 102 is in a rotating state.

In step S922, the motor diagnosis processing unit 200 adjusts the amplitude $C_{id}$ of the d-axis voltage command value $v_d*$ and the amplitude $C_{iq}$ of the q-axis voltage command value $v_q*$ so that the signal level of the current supplied to the motor 102 falls within a detectable range of the current detectors 5u, 5v, and 5w.

For example, if the d-axis voltage command value $v_d*=C_{id}\times\sin(\omega_{non}t)$, and the q-axis voltage command value $v_q*=C_{iq}\times\cos(\omega_{non}t)$, the amplitude $C_{iq}$ of the q-axis voltage command value $v_q*$ is set so that the q-axis current falls within a detectable range, and then the amplitude $C_{id}$ of the d-axis voltage command value $v_d*$ is set so that the d-axis current falls within a detectable range.

In step S923, the motor diagnosis processing unit 200 calculates the d-axis inductance $L_d$ and the q-axis inductance $L_q$ according to Equations (10-1) and (10-2) above on the basis of the measurement value $\beta$ of the phase angle. Herein, the calculated values of the d-axis inductance $L_d$ and the q-axis inductance $L_q$ are used as estimated values (current values).

In step S924, the motor diagnosis processing unit 200 determines whether the absolute value of the difference between the estimated value $L_d$ and the setting value $L_d^*$ of the d-axis inductance is smaller than a third defined value $D_{th3}$, and whether the absolute value of the difference between the estimated value $L_q$ and the setting value $L_q^*$ of the q-axis inductance is smaller than a fourth defined value $D_{th4}$.

As the setting values of the d-axis and q-axis inductances $L_d$ and $L_q$, for example, the value measured at the time of manufacture, a simulation result, the previous value which is the initial setting value or the like is used. The third and fourth defined values $D_{th3}$ and $D_{th4}$ are determined considering the amount of fluctuation in the deviation during normal operation, and are set to, for example, a value to which error, etc. has been added using 0 as a reference.

In step S925, if the absolute value of the difference (deviation) between the estimated value $L_d$ and the setting value $L_d^*$ of the d-axis inductance is smaller than the third defined value $D_{th3}$ and the absolute value of the difference (deviation) between the estimated value $L_q$ and the setting value $L_q^*$ of the q-axis inductance is smaller than the fourth defined value $D_{th4}$, the motor diagnosis processing unit 200 determines that there is no abnormality in the permanent magnet of the motor 102.

If the absolute value of the deviation of the d-axis inductance $L_d$ is equal to or greater than the third defined value $D_{th3}$ or the absolute value of the deviation of the q-axis inductance $L_q$ is equal to or greater than the fourth defined value $D_{th4}$, there is a high possibility of an abnormality in the permanent magnet of the motor 102. In the present embodiment, the processing proceeds to step S925 in order to more accurately specify a motor abnormality assuming that the motor 102 will be stopped. It may also be determined that there is an abnormality of the permanent magnet of the motor 102 when the conditions of step S924 are satisfied.

In step S926, the motor diagnosis processing unit 200 acquires a setting value $\theta^*$ of the electrical angle defined by the q-axis voltage value $v_q$. The q-axis voltage value $v_q$ may be calculated using the voltage value detected by the voltage-type inverter 4, or may be calculated using the d-axis current detection value $i_d$.

Herein, the method for deriving the setting value $\theta^*$ of the electrical angle of the motor 102 will now be briefly explained. The q-axis voltage value $v_q$ can be represented as shown in Equation (14-2) below from the relationship of Equation (14-1) below.

$$\begin{bmatrix} v_d \\ v_q \end{bmatrix} = \begin{bmatrix} R+s \cdot L_d & -\omega_e L_q \\ \omega_e L_d & R+s \cdot L_q \end{bmatrix} \begin{bmatrix} i_d^* \\ i_q^* \end{bmatrix} + \begin{bmatrix} 0 \\ \omega_e K_e \end{bmatrix} \quad (14\text{-}1)$$

$$v_w = \omega_e L_d i_d^* + (R+s \cdot L_q) \, i_q^* + \omega_e K_e \quad (14\text{-}2)$$

$$\theta^* = \omega_e = \frac{\omega_m}{s} = \int \omega_m dt \quad (14\text{-}3)$$

Therefore, by using the relationships in Equations (14-2) and (14-3) above, the setting value $\theta^*$ of the electrical angle of the motor 102 can be derived on the basis of the q-axis voltage value $v_q$.

In step S927, the motor diagnosis processing unit 200 acquires the detection value $\theta$ of the electrical angle output from the rotor position detector 7.

In step S928, the motor diagnosis processing unit 200 determines whether the absolute value of the difference between the setting value $\theta^*$ and the detection value $\theta$ of the electrical angle of the motor 102 is smaller than a fifth defined value $D_{th5}$. In other words, the motor diagnosis processing unit 200 confirms whether the amount of fluctuation in the electrical angle $\theta$ of the motor 102 has become too large. The fifth defined value $D_{th5}$ is determined considering the amount of fluctuation in the deviation during normal operation, and is set to, for example, a value to which error, etc. has been added using 0 as a reference.

If the absolute value of the difference between the setting value $\theta^*$ and the detection value $\theta$ of the electrical angle is smaller than the fifth defined value $D_{th5}$, the motor diagnosis processing unit 200 returns to the process of step S921 and performs the diagnosis again.

In step S929, if the absolute value of the difference between the setting value $\theta^*$ and the detection value $\theta$ of the electrical angle is equal to or greater than the fifth defined value $D_{th5}$, the motor diagnosis processing unit 200 determines that there is an abnormality in the magnetic characteristics of the permanent magnet of the motor 102. This is because when the amount of fluctuation in the electrical angle $\theta$ of the motor 102 has become too large, it can be said that the non-interference control is not established, and thus it can be assumed that an abnormality, i.e. positional deviation or demagnetization, is occurring in the permanent magnet.

Once the process of step S925 or step S929 has finished, the motor diagnosis processing unit 200 sends the determination result to the controller (not illustrated), and the series of processing procedures for the motor 102 diagnosis method of the present embodiment is complete.

According to the second embodiment of the present invention, in a state in which the motor 102 is rotating, the amount of fluctuation of the d-axis inductance $L_d$ and the q-axis inductance $L_q$, which are electrical characteristics of the motor 102, is acquired on the basis of the d-axis voltage command value $v_d^*$ for non-rotating diagnosis and the d-axis current detection value $i_d$ of the motor 102. Thereby, abnormalities in the magnetic characteristics of the motor 102 can be detected. Further, by acquiring the deviation of the electrical angle $\theta$ of the motor 102, abnormalities in the magnetic characteristics of the motor 102 can be more accurately specified.

Third Embodiment

Figure 12:
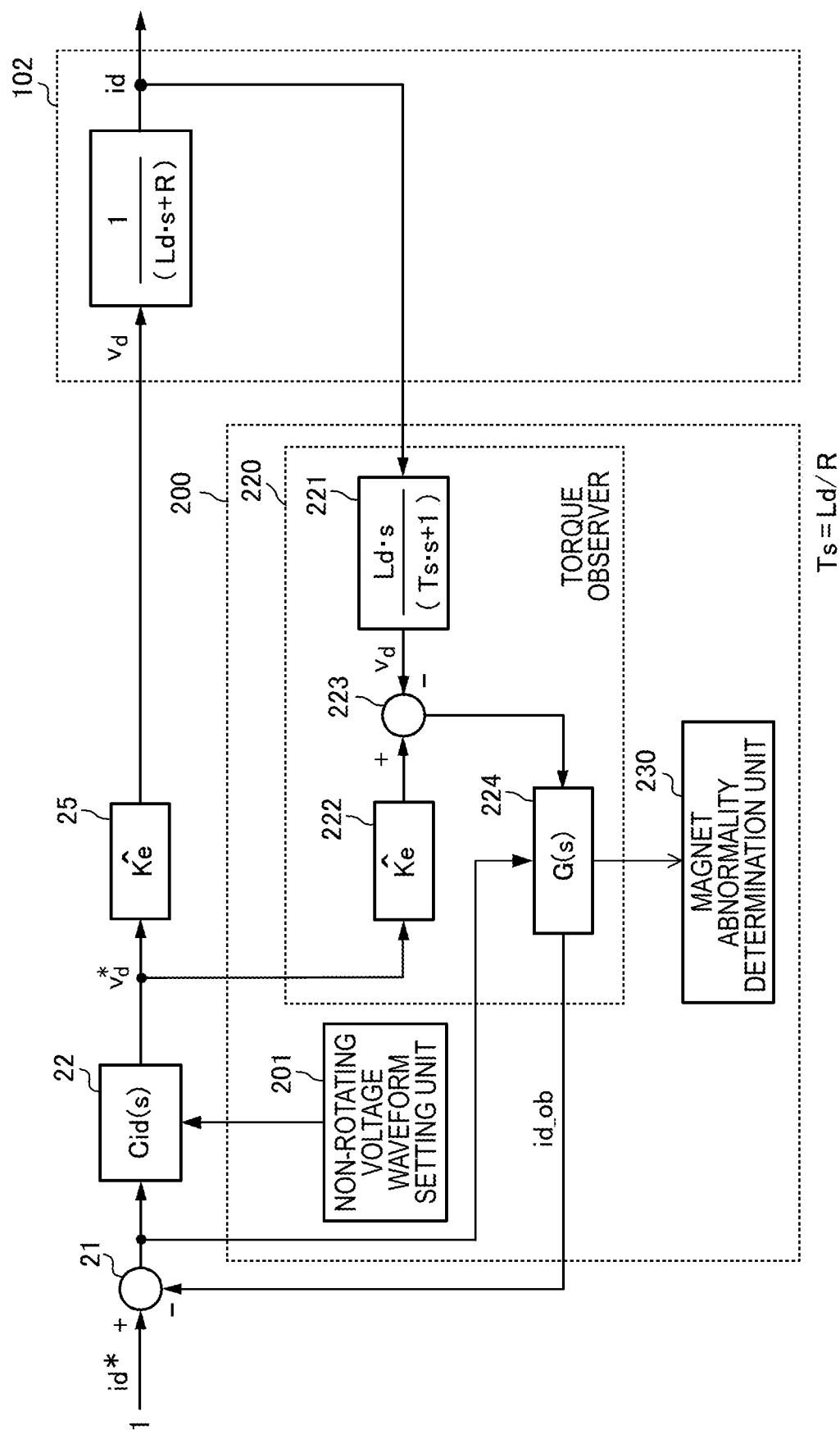
FIG. 12 is a block diagram illustrating a configurational example of a motor diagnosis processing unit according to a third embodiment of the present invention.

FIG. 12 is a block diagram illustrating a configurational example of the motor diagnosis processing unit 200 according to a third embodiment of the present invention.

The current controller 2 is provided with an induction voltage constant multiplier 25 in addition to the constitution of the current controller shown in FIG. 6, and the motor diagnosis processing unit 200 includes the non-rotating voltage waveform setting unit 201, a torque observer 220, and a magnet abnormality determination unit 230.

The induction voltage constant multiplier 25 multiplies the d-axis voltage command value $v_d^*$ output from the d-axis controller 22 by an estimated value $\hat{K_e}$ of the induction voltage constant. The estimated value $\hat{K_e}$ of the induction voltage constant is calculated using, for example, a predetermined calculation equation or map, etc., and is set in the induction voltage constant multiplier 25. The induction voltage constant multiplier 25 outputs the d-axis voltage command value $v_d^*$ multiplied by the induction voltage constant $\hat{K_e}$ to the dq-axis/uvw-phase converter 3. Thereby, the d-axis voltage $v_d$ is applied to the motor 102 from the voltage-type inverter 4 on the basis of the d-axis voltage command value $v_d^*$.

The torque observer 220 includes the following: a transfer function 221; an induction voltage constant multiplier 222; a d-axis voltage deviation calculator 223; and a compensation gain multiplier 224.

The transfer function 221 inputs the d-axis current detection value $i_d$ and filters it as shown in Equation (15) below, and thereby outputs the d-axis voltage detection value $v_d$.

$$v_d = \left(\frac{L_s \cdot s}{T_s \cdot s + 1}\right) \times i_d \quad (15)$$

In the above, $T_s$ is a value ($L_d/R$) obtained by dividing the d-axis inductance $L_d$ by the armature resistance R.

The induction voltage constant multiplier 222 multiplies the d-axis voltage command value $v_d^*$ output from the d-axis controller 22 by the estimated value $\hat{K}_e$ of the induction voltage constant. The estimated value $\hat{K}_e$ of the induction voltage constant is, for example, the same as the estimated value set in the induction voltage constant multiplier 25. The induction voltage constant multiplier 222 outputs the d-axis voltage command value $v_d^*$ multiplied by the estimated value $\hat{K}_e$ of the induction voltage constant to the d-axis voltage deviation calculator 223.

The d-axis voltage deviation calculator 223 calculates the d-axis voltage deviation between the d-axis voltage command value $v_d^*$ from the induction voltage constant multiplier 222 and the d-axis voltage detection value $v_d$ from the transfer function 221, and outputs the d-axis voltage deviation to the compensation gain multiplier 224.

The compensation gain multiplier 224 calculates an observer current value $i_{d\_ob}$ by multiplying the d-axis voltage deviation from the d-axis voltage deviation calculator 223 by a compensation gain G(s). The compensation gain multiplier 224 outputs the observer current value $i_{d\_ob}$ to the d-axis current FB calculator 21 and the magnet abnormality determination unit 230.

The compensation gain G(s) is set using, for example, a predetermined map or the like so that the d-axis current deviation from the d-axis current FB calculator 21 becomes zero (0). When the d-axis current deviation converges on 0, the compensation gain G(s) is set to 1. The compensation gain G(s) can be represented by the following Equation (16).

$$G(s) = \frac{k_e}{\hat{k}_e} \quad (16)$$

When the magnet abnormality determination unit 230 acquires the compensation gain G(s) set by the compensation gain multiplier 224, the magnet abnormality determination unit 230 calculates the measurement value $K_e$ of the induction voltage constant by multiplying the compensation gain G(s) by the estimated value $\hat{K}_e$ of the induction voltage constant. The magnet abnormality determination unit 230 calculates the measurement value $K_e$ of the induction voltage constant every time the angular frequency $\omega_{non}^*$ is changed in a step-wise manner by the non-rotating voltage waveform setting unit 201, and acquires the frequency characteristic $K_e(\omega_{non})$ related to the measurement value.

The magnet abnormality determination unit 230 calculates the absolute value of the difference between the estimated value $\hat{K}_e$ and the measurement value $K_e$ of the induction voltage constant at each angular frequency $\omega_{non}$, and takes the sum of these absolute values of the difference.

If this sum is greater than a predetermined defined value, the magnet abnormality determination unit 230 determines that there is an abnormality in the permanent magnet of the motor 102.

In this way, in the present embodiment, by acquiring the compensation gain G(s) set in the torque observer 220, the magnetic characteristics of the motor 102 can be diagnosed without using the rotor position detector 7 and the rotation speed calculator 8, etc. In other words, the configuration of the motor diagnosis processing unit 200 of the present embodiment can also be applied to a speed sensor-less vector-controlled motor drive system.

In the present embodiment, the internal state of the motor 102 was diagnosed using the measurement value $K_e$ of the induction voltage constant based on the compensation gain G(s). However, the internal state of the motor 102 may be diagnosed using the compensation gain G(s). For example, if the absolute value of the compensation gain G(s) is greater than 0 and smaller than a predetermined value, it is determined that the permanent magnet of the motor 102 is normal, and it is determined that the permanent magnet is abnormal in all other cases. In other words, the motor diagnosis processing unit 200 may diagnose abnormalities in the magnet provided to the motor 102 on the basis of the compensation gain G(s).

Figure 13:
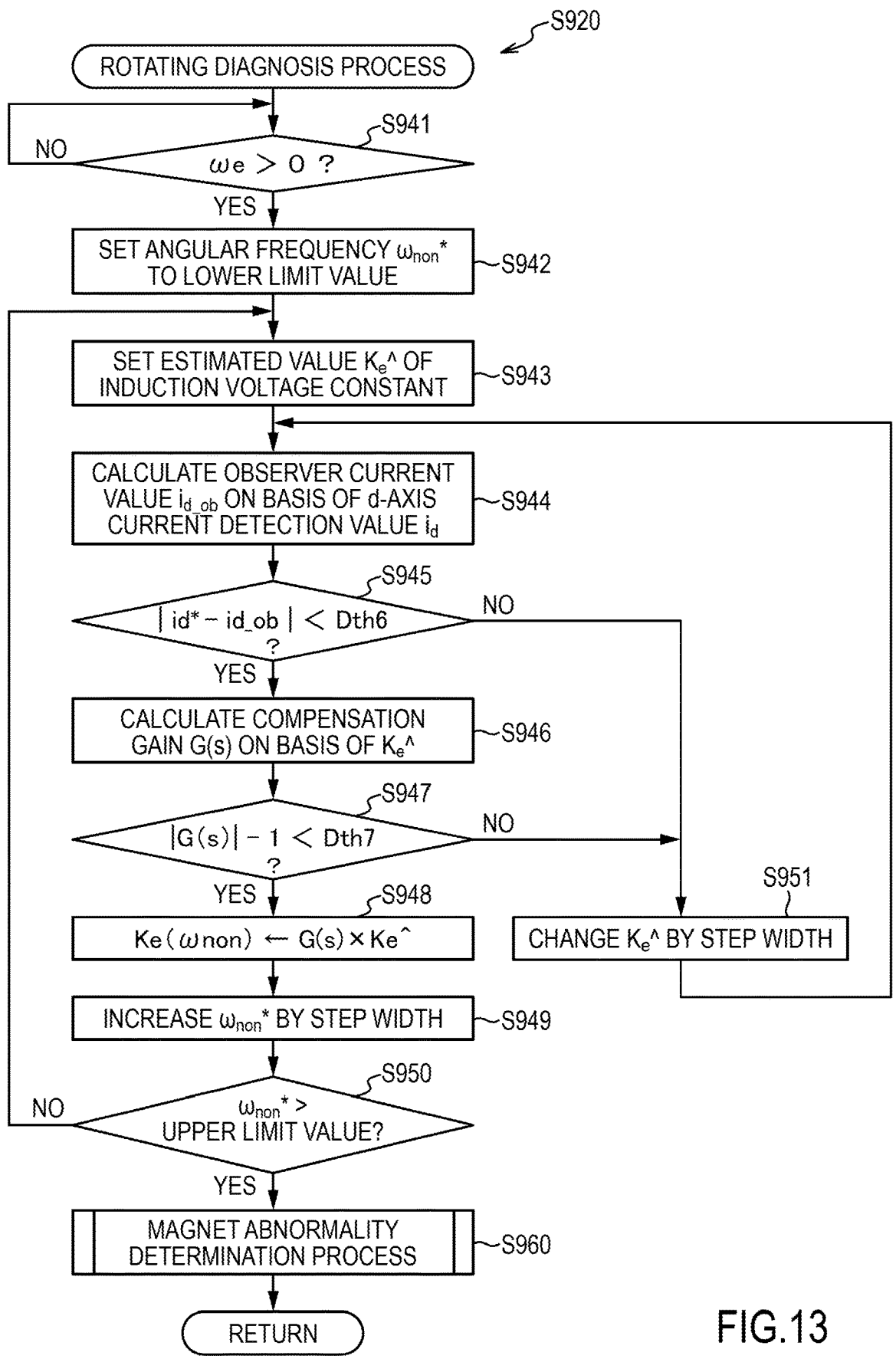
FIG. 13 is a flowchart illustrating one example of a rotating diagnosis process of the motor in the present embodiment.

FIG. 13 is a flowchart illustrating one example of a rotating diagnosis process of the motor 102 in the present embodiment.

In step S941, the motor diagnosis processing unit 200 determines whether the rotation speed $\omega_e$ of the motor 102 is greater than zero (0) rad/s.

In step S942, the motor diagnosis processing unit 200 sets the angular frequency $\omega_{non}^*$ of the non-rotating voltage command value $v_d^*$ to the lower limit value of the change range established for acquiring the frequency characteristic.

In step S943, the motor diagnosis processing unit 200 calculates the estimated value $\hat{K}_e$ of the induction voltage constant according to the operation state of the motor 102. For example, the motor diagnosis processing unit 200 calculates the estimated value $\hat{K}_e$ of the induction voltage constant using a map in which the induction voltage constant $K_e$ is associated with each operation point of the torque command value $T^*$ and the rotation speed $\omega_e$ of the motor 102. The current controller 2 multiplies the d-axis voltage command value $v_d^*$ by the estimated value $\hat{K}_e$ of the induction voltage constant, and the voltage-type inverter 4 applies the three-phase AC voltage to the motor 102 on the basis of the d-axis voltage command value $v_d^*$ that has been multiplied.

In step S944, the motor diagnosis processing unit 200 calculates the observer current value $i_{d\_ob}$ on the basis of the d-axis current detection value $i_d$.

In the present embodiment, the motor diagnosis processing unit 200 calculates the d-axis voltage detection value $v_d$ according to Equation (15) above on the basis of the d-axis current detection value $i_d$, and then calculates the voltage deviation between the calculated d-axis voltage detection value $v_d$ and the d-axis voltage command value $v_d^*$ after being multiplied by the estimated value $\hat{K}_e$ of the induction voltage constant. The motor diagnosis processing unit 200 calculates the observer current value $i_{d\_ob}$ by multiplying the voltage deviation by the compensation gain G(s).

In other words, the motor diagnosis processing unit 200 estimates the value $i_{d\_ob}$ of the d-axis current supplied to the motor 102 by multiplying the deviation of the d-axis voltage by the predetermined compensation gain G(s).

In step S945, when the calculated value of the d-axis current derived from Equation (14-1) above is set to the d-axis current command value $i_d^*$, the motor diagnosis processing unit 200 determines whether the absolute value of the difference between the d-axis current command value $i_d^*$ and the observer current value $i_{d\_ob}$ is smaller than a sixth defined value $D_{th6}$. The sixth defined value $D_{th6}$ is determined considering the amount of fluctuation in the deviation during normal operation, and is set to, for example, a value to which error, etc. has been added using 0 as a reference.

In step S951, if the absolute value of the difference between the d-axis current command value $i_d^*$ and the observer current value $i_{d\_ob}$ is equal to or greater than the sixth defined value $D_{th6}$, the motor diagnosis processing unit 200 increases or decreases the estimated value $\hat{K}_e$ of the induction voltage constant by a predetermined step width. The motor diagnosis processing unit 200 then changes the estimated value $\hat{K}_e$ of the induction voltage constant until the absolute value of the difference between the d-axis current command value $i_d^*$ and the observer current value $i_{d\_ob}$ becomes smaller than the sixth defined value $D_{th6}$.

In step S946, the motor diagnosis processing unit 200 calculates the compensation gain G(s) using a predetermined calculation equation or map, etc. on the basis of the estimated value $\hat{K}_e$ of the induction voltage constant.

In step S947, the motor diagnosis processing unit 200 determines whether a value obtained by subtracting 1 from the absolute value of the compensation gain G(s) is smaller than a seventh defined value $D_{th7}$. The seventh defined value $D_{th7}$ is determined considering the amount of fluctuation in the deviation during normal operation, and is set to, for example, a value to which error, etc. has been added using 0 as a reference.

If the value obtained by subtracting "1" from the compensation gain G(s) is equal to or greater than the seventh, defined value $D_{th7}$, the motor diagnosis processing unit 200 proceeds to step S951, and changes the estimated value $\hat{K}_e$ of the induction voltage constant. Subsequently, the motor diagnosis processing unit 200 repeats the processes from step S944 to step S947 and step S951 until the absolute value of the deviation between the d-axis current command value $i_d^*$ and the observer current value $i_{d\_ob}$ becomes smaller than the sixth defined value $D_{th6}$ and the value obtained by subtracting 1 from the compensation gain G(s) becomes smaller than the seventh defined value $D_{th7}$.

In other words, the motor diagnosis processing unit 200 changes the setting value of the compensation gain G(s) so that the d-axis current deviation ($i_d^* - i_{d\_ob}$) of the motor 102 decreases.

In step S948, the motor diagnosis processing unit 200 associates a value (G(s)×$\hat{K}_e$) obtained by multiplying the compensation gain G(s) by the estimated value $\hat{K}_e$ of the induction voltage constant with the angular frequency $\omega_{non}$ as the measurement value $K_e$ of the induction voltage constant, and records this in the memory.

In step S949, the motor diagnosis processing unit 200 increases the setting value $\omega_{non}^*$ of the angular frequency by a predetermined step width.

In step S950, the motor diagnosis processing unit 200 determines whether the setting value $\omega_{non}^*$ of the angular frequency is greater than the upper limit value of the change range. If the setting value $\omega_{non}^*$ of the angular frequency is equal to or smaller than the upper limit value of the change range, the motor diagnosis processing unit 200 returns to the process of step S942 and repeats the processes of step S943 to step S951. In other words, the motor diagnosis processing unit 200 records the measurement value $K_e$ of the induction voltage constant at each angular frequency $\omega_{non}$ in the memory. Therefore, the frequency characteristic $K_e(\omega_{non})$ related to the measurement value of the induction voltage constant is retained in the memory.

In step S960, if the setting value $\omega_{non}^*$ of the angular frequency is greater than the upper limit value of the change range, the motor diagnosis processing unit 200 stops changing the angular frequency $\omega_{non}^*$, and executes a magnet abnormality determination process for determining whether the permanent magnet of the motor 102 is abnormal. This magnet abnormality determination process will be explained below referring to FIG. 14.

Once the magnet abnormality determination process of step S960 has finished, the motor diagnosis processing unit 200 returns to the process shown in FIG. 10, and the series of processing procedures for the rotating diagnosis process of step S920 is complete.

Figure 14:
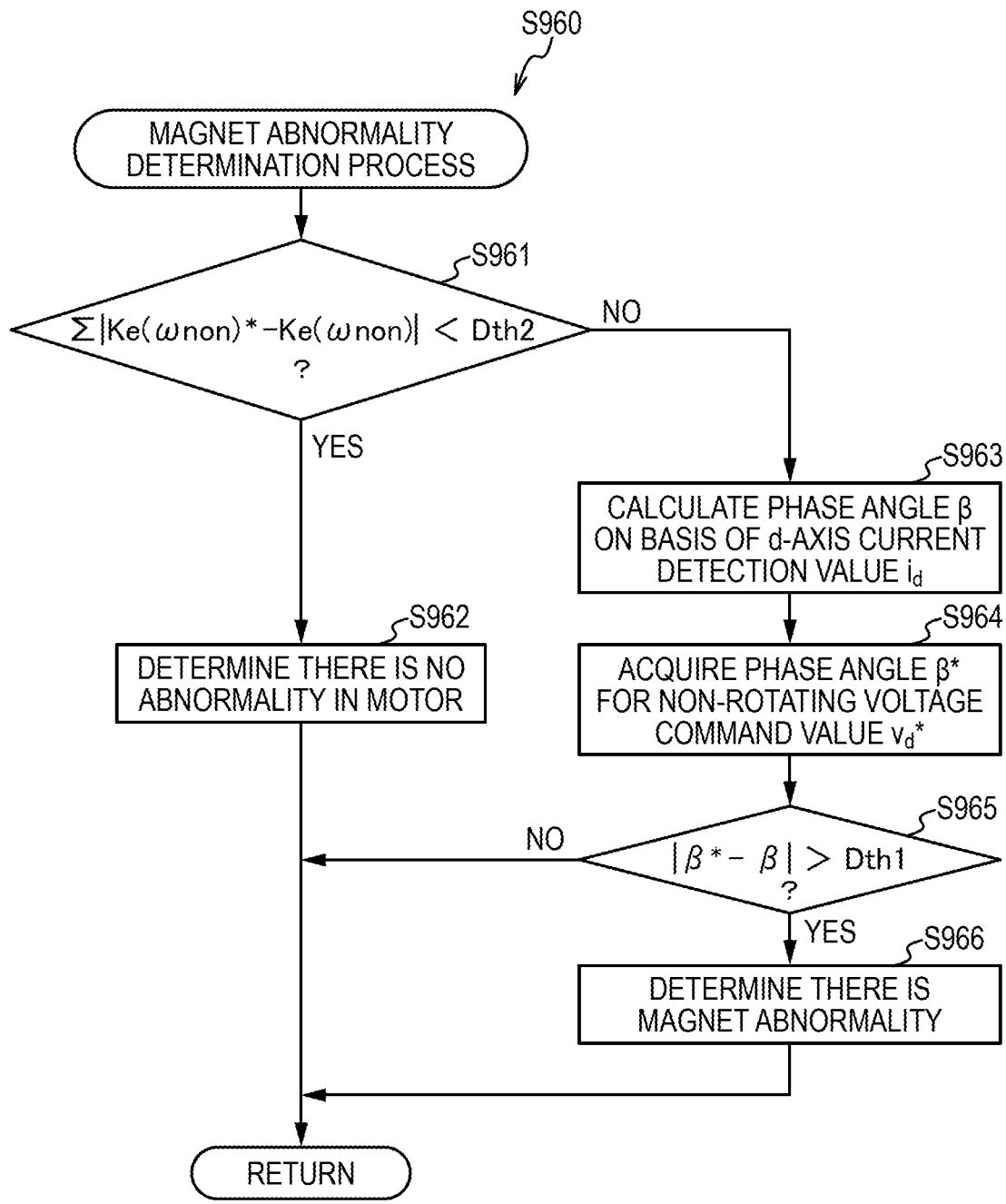
FIG. 14 is a flowchart illustrating one example of a magnet abnormality determination process that is executed in the rotating diagnosis process of the motor.

FIG. 14 is a flowchart illustrating one example of the magnet abnormality determination process executed in step S960.

In step S961, the motor diagnosis processing unit 200 calculates the absolute values of the difference between the measurement value $K_e$ and the setting value $K_e^*$ for the induction voltage constant (deviation of the induction voltage constant $K_e$) at each angular frequency $\omega_{non}$, and determines whether the sum thereof is smaller than the second defined value $D_{th2}$.

In step S962, if the sum of the absolute values of the deviation of the induction voltage constant $K_e$ is at each angular frequency $\omega_{non}$ smaller than the second defined value $D_{th2}$, the motor diagnosis processing unit 200 determines that there are no electrical or magnetic abnormalities in the motor 102.

On the other hand, if the sum of the absolute values of the deviation of the induction voltage constant $K_e$ at each angular frequency $\omega_{non}$ is equal to or greater than the second defined value $D_{th2}$, there is a high possibility of an abnormality in the magnetic characteristics of the permanent magnet of the motor 102, and thus the motor diagnosis processing unit 200 proceeds to the process of step S963 in order to specify the motor abnormality more reliably.

In step S963, if the rotation speed $\omega_e$ of the motor 102 has reached a predetermined value, the motor diagnosis processing unit 200 calculates the measurement value β of the phase angle on the basis of the d-axis current detection value $i_d$ similar to the processes of steps S904 and S905 shown in FIG. 8.

In step S964, the motor diagnosis processing unit 200 acquires the setting value β* of the phase angle defined by the d-axis voltage command value $v_d^*$ generated by the d-axis controller 22 similar to the process of step S906 shown in FIG. 8.

In step S965, the motor diagnosis processing unit 200 determines whether the absolute value of the difference between the setting value β* and the measurement value β for the phase angle is smaller than the first defined value $D_{th1}$ similar to the process of step S906 shown in FIG. 8. If the difference between the setting value β* and the measurement value β for the phase angle is smaller than the first defined value $D_{th1}$, the magnet abnormality determination process is terminated.

In step S966, if the difference between the setting value β* and the measurement value β for the phase angle is equal to or greater than the first defined value $D_{th1}$, the motor diagnosis processing unit 200 determines that there is an abnormality in the magnetic characteristics of the motor 102.

In other words, if the sum of the absolute values of the deviation of the induction voltage constant $K_e$ at each angular frequency $\omega_{non}$ is greater than the second defined value $D_{th2}$ and the difference between the setting value $\beta^*$ and the measurement value $\beta$ for the phase angle is greater than the first defined value $D_{th1}$, the motor diagnosis processing unit 200 determines that there is an abnormality in the magnetic characteristics of the motor 102.

Once the process of step S962 or S966 has finished, the motor diagnosis processing unit 200 terminates the series of processing procedures for the magnet abnormality determination process and returns to the rotating diagnosis process shown in FIG. 13.

According to the third embodiment of the present invention, the motor diagnosis processing unit 200 includes step S944, in which the deviation of the d-axis voltage of the motor 102 is calculated on the basis of the d-axis current $i_d$ of the motor 102 and then the d-axis current is estimated by multiplying the calculated d-axis voltage deviation by the predetermined compensation gain G(s), and step S946, in which the value of the compensation gain G(s) is set so that the deviation of the d-axis current decreases.

In this diagnosis method, it is determined that the permanent magnet of the motor 102 is abnormal on the basis of the compensation gain G(s) that was set as in the processes of step S948 and step S961. By acquiring the compensation gain G(s) for estimating the d-axis current in this way, the magnetic characteristics of the motor 102 can be diagnosed.

In other words, by making the angular frequency $\omega_{non}$ of the non-rotating voltage signal fluctuate and comparing a preset control gain G(s) with the diagnosis parameter calculation results, the current characteristic fluctuation amount in each speed region can be measured regardless of the rotation state of the motor 102. Therefore, the measurement accuracy of the fluctuation amount of the motor characteristics while the motor 102 is rotating can be improved. Further, according to the present embodiment, since the measurement value of the compensation gain G(s) can be set to a control parameter of the motor 102 by measuring the compensation gain G(s), the motor 102 can be more accurately controlled.

In addition, according to the present embodiment, in step S905 shown in FIG. 10, the motor diagnosis processing unit 200 calculates the phase angle $\beta$, which is an electrical characteristic of the motor 102, in a non-rotating state in which the rotation of the motor 102 is stopped. The motor diagnosis processing unit 200 then sets the compensation gain G(s) during rotation of the motor 102 in step S948, and determines whether the magnetic characteristics of the motor 102 are abnormal on the basis of the electrical characteristic p of the motor 102 and the compensation gain G(s) in step S961.

Thereby, when it has been determined that there is an insulation abnormality in the motor 102 on the basis of the measurement value of the electrical characteristic $\beta$ of the motor 102, subsequent diagnosis processing during rotation of the motor 102 can be eliminated. Therefore, unnecessary diagnosis processing during rotation of the motor 102 can be eliminated. Further, by using the compensation gain G(s) in addition to the electrical characteristic $\beta$ of the motor 102 as diagnosis parameters, a more accurate diagnosis can be realized.

Fourth Embodiment

Figure 15:
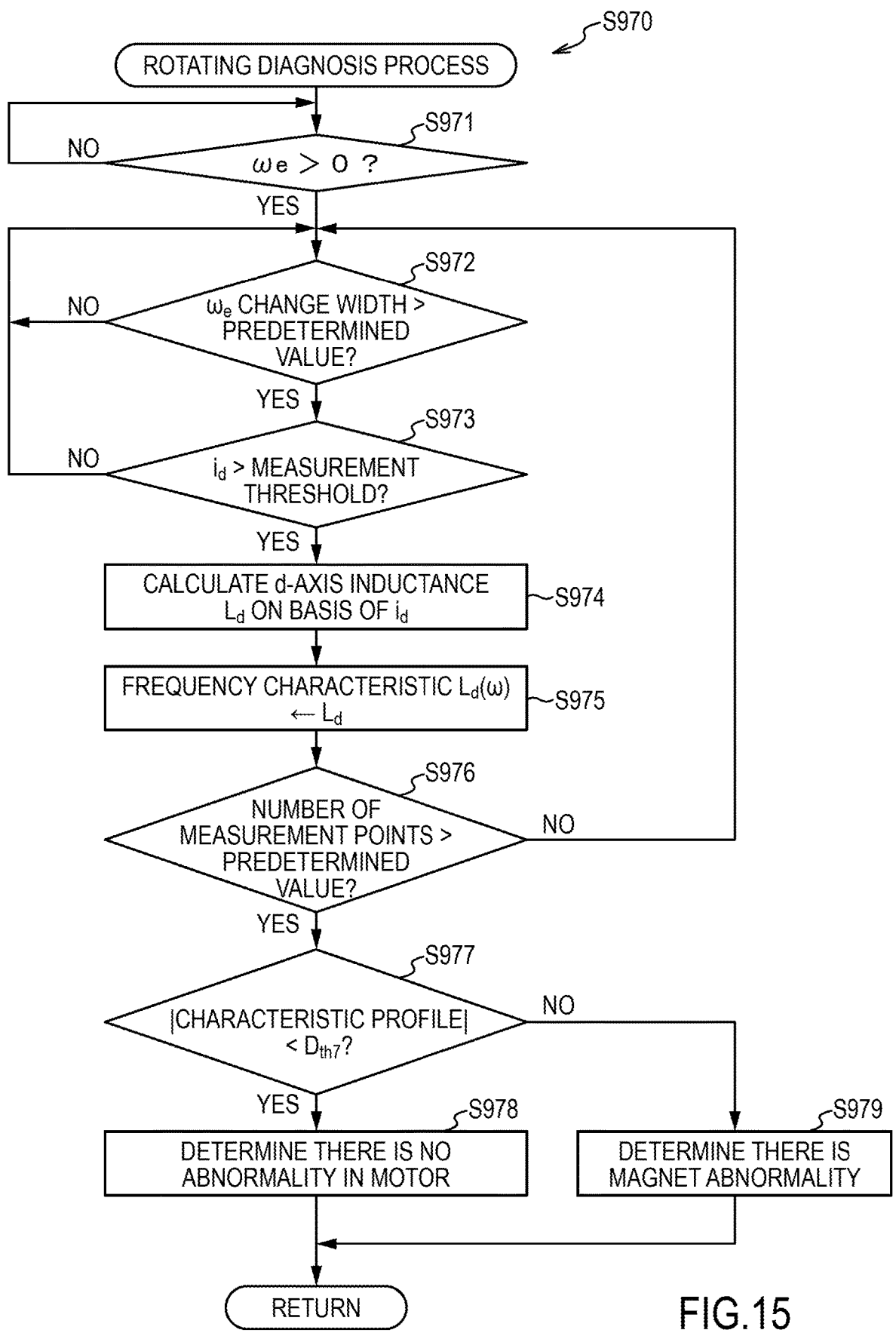
FIG. 15 is a flowchart illustrating one example of a rotating diagnosis process of the motor according to a fourth embodiment of the present invention.

FIG. 15 is a flowchart illustrating one example of a rotating diagnosis process of the motor 102 according to a fourth embodiment of the present invention.

In step S971, the motor diagnosis processing unit 200 determines whether the rotation speed $\omega_e$ of the motor 102 is greater than zero (0).

In step S972, the motor diagnosis processing unit 200 determines whether a change width of the rotation speed $\omega_e$, of the motor 102 is greater than a predetermined value.

In step S973, if the change width of the rotation speed $\omega_e$ of the motor 102 is greater than the predetermined value, the motor diagnosis processing unit 200 acquires the d-axis current detection value $i_d$, and determines whether the d-axis current detection value $i_d$ is greater than a predetermined measurement threshold, which is the minimum requirement for securing the measurement accuracy. If the d-axis current detection value $i_d$ is smaller than the measurement threshold, the motor diagnosis processing unit 200 returns to the process of step S972.

In step S974, if the d-axis current detection value $i_d$ is greater than the measurement threshold, the motor diagnosis processing unit 200 calculates the d-axis inductance $L_d$ on the basis of the d-axis current detection value $i_d$.

Similar to the processes of steps S904 and S905 shown in FIG. 8, the motor diagnosis processing unit 200 of the present embodiment calculates the measurement value $\beta$ of the phase angle on the basis of the d-axis current detection value $i_d$, and calculates the d-axis inductance $L_d$ according to Equation. (10-1) on the basis of the measurement value $\beta$ of the phase angle.

In step S975, the n rotor diagnosis processing unit 200 associates the calculated d-axis inductance $L_d$ and the angular frequency $\omega$ of the d-axis voltage command value $v_d^*$ at that time, and records this in the memory.

In step S976, the motor diagnosis processing unit 200 determines whether the number of measurement points of the angular frequency w in a predetermined frequency range has exceeded a predetermined value. If the number of measurement points of the angular frequency $\omega$ has not reached the predetermined value, the motor diagnosis processing unit 200 returns to the process of step S972, and records the d-axis inductance $L_d$ in the memory until the number of measurement points of the angular frequency $\omega$ exceeds the predetermined value. The predetermined value mentioned herein is determined using, for example, experimental data or the like, and specifically, the predetermined value is set to a number of points necessary for determining whether or not the magnetic characteristics of the motor 102 are normal.

In step S977, if the number of measurement points of the angular frequency $\omega$ has exceeded the predetermined value, the motor diagnosis processing unit 200 compares the characteristic profile of the motor 102 with the frequency characteristic $L_d(\omega)$ of the d-axis inductance within the memory.

In the present embodiment, the motor diagnosis processing unit 200 calculates the absolute value of the difference between, the setting value $L_d^*$ of the characteristic profile and the calculated value $L_d$ of the d-axis inductance at each angular frequency recorded in the memory, and determines whether the sum of these absolute values is smaller than the seventh defined value $D_{th7}$.

The seventh defined value $D_{th7}$ is determined considering the amount of fluctuation in the deviation during normal operation, and is set to, for example, a value to which error, etc. has been added using 0 as a reference. Further, the characteristic profile differs from the calculation map used in the estimation of the parameters of the motor 102, and indicates the characteristics of the motor 102 itself.

In step S978, if the sum of the absolute values of the difference between the setting value $L_d^*$ of the characteristic profile and the calculated value $L_d$ of the d-axis inductance at each angular frequency (measurement point) is smaller than the seventh defined value $D_{th7}$, the motor diagnosis processing unit 200 determines that there are no abnormalities in the motor 102.

In step S979, if the sum of the absolute values of the difference between the setting value $L_d^*$ and the calculated value $L_d$ of the d-axis inductance at each angular frequency is equal to or greater than the seventh defined value $D_{th7}$, the motor diagnosis processing unit 200 determines that the permanent magnet of the motor 102 is abnormal.

Once the process of step S978 or step S979 has finished, the motor diagnosis processing unit 200 sends the determination result to the controller (not illustrated), and the series of processing procedures for the rotating diagnosis process of the present embodiment is complete.

According to the fourth embodiment of the present invention, the internal state of the motor 102 can be diagnosed by calculating the d-axis inductance $L_d$ every time the rotation speed $\omega_e$ of the motor 102 changes and acquiring the frequency characteristic $L_d(\omega)$ thereof. In the present embodiment, the d-axis inductance $L_d$ was calculated every time the rotation speed $\omega_e$ of the motor 102 changes. However, the d-axis inductance $L_d$ may be calculated every time the angular frequency of the d-axis voltage command value $v_d^*$ changes.

Fifth Embodiment

Figure 16:
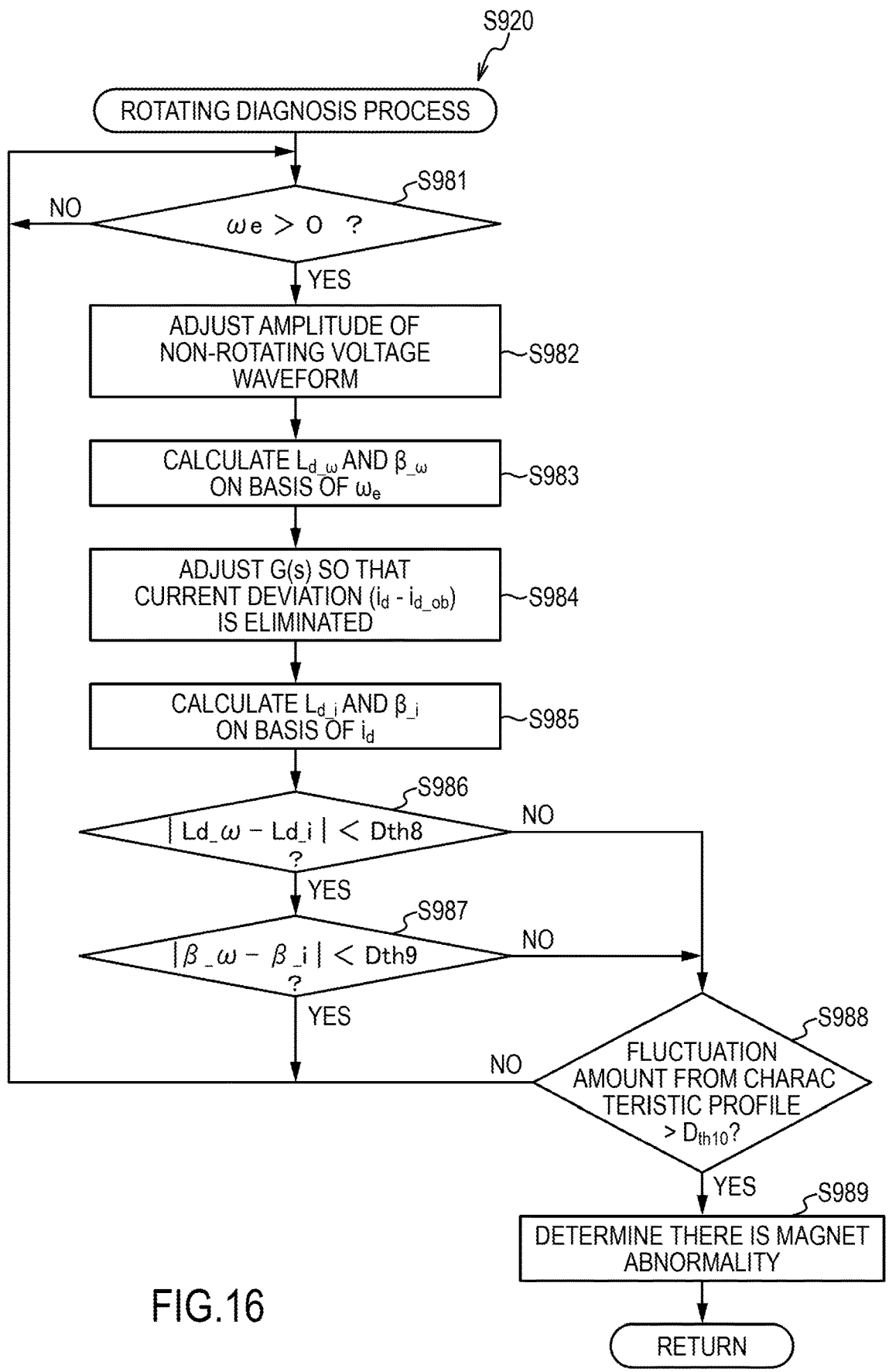
FIG. 16 is a flowchart illustrating one example of a motor diagnosis method according to a fifth embodiment of the present invention.

FIG. 16 is a flowchart illustrating one example of a rotating diagnosis method of the motor 102 according to a fifth embodiment of the present invention.

In step S981, the motor diagnosis processing unit 200 determines whether the rotation speed $\omega_e$ of the motor 102 is greater than zero (0) rad/s.

In step S982, if the rotation speed $\omega_e$ of the motor 102 is greater than zero (0) rad/s, the motor diagnosis processing unit 200 executes a process to adjust the d-axis amplitude $C_{id}$ and the q-axis amplitude $C_{iq}$ of the voltage command value as in step S922 of FIG. 14.

In step S983, the motor diagnosis processing unit 200 calculates the d-axis inductance $L_{d\_\omega}$ and the phase angle $\beta_{\_\omega}$ using a predetermined calculation equation or map, etc. on the basis of the rotation speed $\omega_e$ of the motor 102.

In step S984, the motor diagnosis processing unit 200 adjusts the compensation gain $G(s)$ so that the current deviation between the d-axis current command value $i_d^*$ and the observer d-axis current value $i_{d\_os}$ converges on zero as in the processing content from step S943 to step S947 shown in FIG. 13.

In step S985, if the current deviation $(i_d^*-i_{d\_os})$ has converged on zero, the motor diagnosis processing unit 200 calculates the d-axis inductance $L_{d\_i}$ and the phase angle $\beta_{\_i}$ on the basis of the d-axis current detection value $i_d$.

In the step S986, the motor diagnosis processing unit 200 determines whether the absolute value of the deviation $(L_{d\_\omega}-L_{d\_i})$ between the d-axis inductance calculated in step S983 and the d-axis inductance calculated in step S985 is greater than an eighth defined value $D_{th8}$. The eighth defined value $D_{th8}$ is determined considering the amount of fluctuation in the deviation during normal operation, and is set to, for example, a value to which error, etc. has been added using 0 as a reference.

In step S987, if the absolute value of the deviation $(L_{d\_\omega}-L_{d\_i})$ of the d-axis inductance is smaller than the eighth defined value $D_{th8}$, the motor diagnosis processing unit 200 determines whether the absolute value of the deviation between the phase angle $\beta_{\_\omega}$ calculated in step S983 and the phase angle $\beta_{\_i}$ calculated in step S985 is smaller than a ninth defined value $D_{th9}$. If the absolute value of the deviation $(\beta_{\_\omega}-\beta_{\_i})$ of the phase angle is smaller than the ninth defined value $D_{th9}$, the motor diagnosis processing unit 200 returns to the process of step S981.

On the other hand, if the absolute value of the deviation $(L_{d\_\omega}-L_{d\_i})$ of the d-axis inductance is greater than the eighth defined value $D_{th8}$, or if the absolute value of the deviation $(\beta_{\_\omega}-\beta_{\_i})$ of the phase angle is greater than the ninth defined value $D_{th9}$, the motor diagnosis processing unit 200 proceeds to the process of step S988.

In step S988, the motor diagnosis processing unit 200 compares the calculated values at the angular frequency w acquired up to this point with the characteristic profile similar to the process of step S977 shown in FIG. 15.

Specifically, if the absolute value of the deviation $(L_{d\_\omega}-L_{d\_i})$ of the d-axis inductance is greater than the eighth defined value $D_{th8}$, the motor diagnosis processing unit 200 determines whether the sum of the absolute values of the deviation between the calculated values $L_{d\_\omega}$, $L_{d\_i}$ of the d-axis inductance and the characteristic profile is greater than a tenth defined value $D_{th10}$.

Further, if the absolute value of the deviation $(\beta_{\_\omega}-\beta_{\_i})$ of the phase angle is greater than the ninth defined value $D_{th9}$, the motor diagnosis processing unit 200 determines whether the sum of the absolute values of the deviation between the calculated values $\beta_{\_\omega}$, $\beta_{\_i}$ of the phase angle and the characteristic profile is greater than the tenth defined value $D_{th10}$.

In step S989, if the sum of the absolute values of the deviation between the calculated values $L_{d\_\omega}$, $L_{d\_i}$ of the d-axis inductance and the characteristic profile is greater than the tenth defined value $D_{th10}$, or if the sum of the absolute values of the deviation between the calculated values $\beta_{\_\omega}$, $\beta_{\_i}$ of the phase angle and the characteristic profile is greater than the tenth defined value $D_{th10}$, the motor diagnosis processing unit 200 determines that there is a magnet abnormality.

According to the fifth embodiment of the present invention, the characteristic parameters $L_d$ and $\beta$ are calculated using the speed feedback, and the characteristic parameters $L_d$ and $\beta$ are calculated using the d-axis current deviation. Further, it is determined that the motor 102 is normal by confirming that the difference of these two characteristic parameters falls within a defined value. Thereby, the internal state of the motor 102 can be diagnosed more accurately during rotation of the motor 102.

In the above-described embodiments, examples for diagnosing the internal state of an IPM motor have been explained. However, the internal state can be diagnosed similar to the above-described embodiments in an induction motor as well. In the following, a model example of an induction motor to which the present invention can be applied will be briefly explained.

Sixth Embodiment

Figure 17:
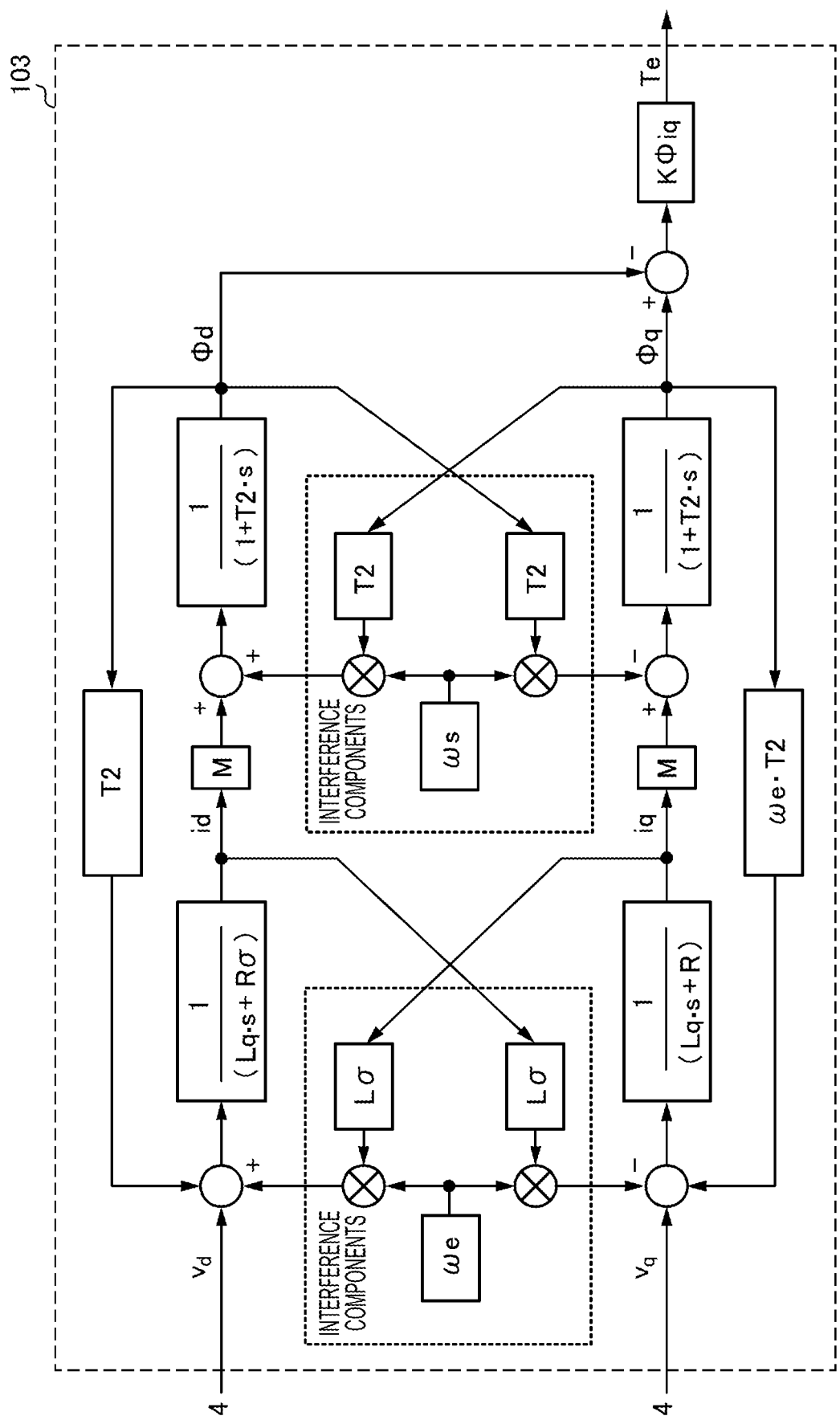
FIG. 17 illustrates another example of a motor model which can be diagnosed using a motor diagnosis method according to a sixth embodiment of the present invention.

FIG. 17 illustrates an example of a motor model in which the inside of a motor 103 according to a sixth embodiment of the present invention is modeled in a dq-axis coordinate system.

As shown in FIG. 17, the dotted line portion is an area in which interference components generated by the q-axis current and the d-axis current are modeled. If the values of the electrical parameters of this dotted line portion are known, then the compensation value for cancelling out the dq-axis interference components can be calculated in advance using a linear equation.

Therefore, if the electrical constant Lσ, which is the sum of the stator inductance L1 and the primary-side converted value L2' of the rotor inductance, a motor secondary time constant T2, and a slip angle $\omega_s$ can be estimated, a state equation of the motor 103 can be converted to a linear equation similar to the case of the IPM motor.

Further, in the motor 103 of the present embodiment, the method of the third embodiment can be applied in cases where an equivalent circuit model as shown in FIG. 3 is established. For example, if the electrical constant Lσ, the motor secondary time constant T2, and the slip angle $\omega_s$ can be calculated, the inductance setting values of the electrical loading and the magnetic loading can be derived.

Therefore, in the motor 103 of the present embodiment, similar to the above-described embodiments, even if the motor 103 is in a non-rotating state, a voltage can be applied to the motor 103 on the basis of the non-rotating voltage command value $v_d{}^*$, and in this state, the motor 103 can be diagnosed on the basis of the current $i_d$ supplied to the motor 103.

Embodiments of the present invention have been explained above, but these embodiments represent only a portion of the application examples of the present invention, and the technical scope of the present invention should not be construed as being limited to the concrete constitutions of the above embodiments.

For example, in the above embodiments, characteristic parameters such as the phase angle β, the d-axis inductance $L_d$, and the induction voltage constant $K_e$ were calculated on the basis of measurement parameters such as the speed information of the motor and the current feedback, and a diagnosis was performed by comparing these calculated parameters with setting data. However, the measurement parameters are not limited to such physical quantities, and detection values of various sensors such as a speed sensor, an angular speed sensor, and an acceleration sensor may be used, and characteristic abnormalities may be determined by calculating characteristic parameters using such detection values.

Further, in the above embodiments, motor abnormalities were determined on the basis of the sum of the absolute values of the deviation between calculated parameters. However, as long as a degree of divergence between the calculated parameters and the setting values can be determined, an average value of the absolute values of the deviation or the like can also be used.

The above embodiments may also be combined as appropriate.

The present application claims a priority based on Japanese Patent Application No. 2015-248793 filed on Dec. 21, 2015, all the contents of which are incorporated hereby by reference.

The invention claimed is:

1. A diagnosis method for diagnosing a state of a motor, the method comprising:
   a non-rotating state determination step in which a determination of whether or not a rotation speed of the motor is 0 is determined;
   a non-rotating voltage signal calculation step in which, when the rotation speed of the motor is determined to be 0, a non-rotating voltage signal that is required to maintain the rotation speed of the motor at 0 in a state where an alternating current is supplied to the motor is calculated;
   an application step in which an alternating voltage is applied to the motor on the basis of the non-rotating voltage signal;
   a measurement step in which an alternating current supplied to the motor by the application step is measured;
   a calculation step in which an electrical characteristic of the motor is calculated on the basis of the alternating current measured by the measurement step; and
   a determination step in which an abnormality of the motor is determined on the basis of the electrical characteristic of the motor calculated by the calculation step and a parameter related to the non-rotating voltage signal.

2. The motor diagnosis method according to claim 1, wherein:
   in the application step, a frequency of the non-rotating voltage signal is changed;
   in the calculation step, a frequency characteristic is calculated as the electrical characteristic of the motor; and
   in the determination step, an abnormality of a magnet provided to the motor is determined on the basis of the frequency characteristic and the parameter.

3. The motor diagnosis method according to claim 1, wherein in the application step, the alternating voltage is applied to the motor on the basis of the non-rotating voltage signal by setting voltage command values such that a q-axis voltage command value becomes 0.

4. A diagnosis method for diagnosing a state of a motor, the method comprising:
   an application step in which a voltage is applied to the motor on the basis of a non-rotating voltage signal that causes a rotation speed of the motor to become 0;
   a measurement step in which a current supplied to the motor, to which the voltage has been applied by the application step, is measured;
   a calculation step in which an electrical characteristic of the motor is calculated on the basis of the current of the motor measured by the measurement step; and
   a determination step in which an abnormality of the motor is determined on the basis of the electrical characteristic of the motor calculated by the calculation step and a parameter related to the non-rotating voltage signal,
   wherein the calculation step includes:
      calculating a d-axis current detection value on the basis of the current of the motor measured by the measurement step;
      calculating a d-axis voltage detection value on the basis of the d-axis current detection value;
      calculating a d-axis voltage command value on the basis of the non-rotating voltage signal; and
      calculating a deviation of the d-axis voltage detection value and the d-axis voltage command value,
   wherein the method further comprises:
      a current estimation step in which a d-axis current estimation value is calculated by multiplying the deviation of the d-axis voltage by a predetermined compensation gain; and
      a setting step in which the predetermined compensation gain is set so that a deviation of the d-axis current detection value and the d-axis current estimation value decreases, and
   wherein in the determination step, it is determined that a magnet provided to the motor is abnormal on the basis of the compensation gain.

5. The motor diagnosis method according to claim 4, wherein:

in the calculation step, the electrical characteristic of the motor is calculated when the rotation of the motor is stopped;

in the setting step, the compensation gain is set when the motor is rotating; and in the determination step, it is determined whether a magnetic characteristic of the motor is abnormal on the basis of the electrical characteristic of the motor and the compensation gain.

6. A power conversion device for a motor, comprising:

a power converter configured to energize and apply an alternating voltage to the motor;

a sensor configured to measure an alternating current supplied to the motor from the power converter;

a non-rotating state determination unit configured to determine whether or not a rotation speed of the motor is 0;

a non-rotating voltage signal calculation unit configured to calculate, when the rotation speed of the motor is determined to be 0, a non-rotating voltage signal that is required to maintain the rotation speed of the motor at 0 in a state where an alternating current is supplied to the motor;

a calculator configured to calculate an electrical characteristic of the motor on the basis of the alternating current of the motor measured by the sensor; and a diagnosis unit configured to determine an abnormality of the motor on the basis of the electrical characteristic of the motor calculated by the calculator and a parameter related to the non-rotating voltage signal.

7. The power conversion device according to claim 6, wherein the power converter is configured to apply the alternating voltage to the motor on the basis of the non-rotating voltage signal by setting voltage command values such that a q-axis voltage command value becomes 0.

8. A power conversion device for a motor, comprising:

a power converter configured to energize and apply an alternating voltage to the motor;

a sensor configured to measure an alternating current supplied to the motor from the power converter; and a controller configured to:

determine whether or not a rotation speed of the motor is 0;

calculate, when the rotation speed of the motor is determined to be 0, a non-rotating voltage signal that is required to maintain the rotation speed of the motor at 0 in a state where an alternating current is supplied to the motor;

calculate an electrical characteristic of the motor on the basis of the alternating current of the motor measured by the sensor; and determine an abnormality of the motor on the basis of the electrical characteristic of the motor calculated by the controller and a parameter related to the non-rotating voltage signal.

\* \* \* \* \*